United States Patent
Ervin

(10) Patent No.: US 7,149,838 B2
(45) Date of Patent: Dec. 12, 2006

(54) METHOD AND APPARATUS FOR CONFIGURING MULTIPLE SEGMENT WIRED-AND BUS SYSTEMS

(75) Inventor: Joseph J. Ervin, Stow, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 687 days.

(21) Appl. No.: 09/867,129

(22) Filed: May 29, 2001

(65) Prior Publication Data
US 2004/0225813 A1 Nov. 11, 2004

(51) Int. Cl.
*G06F 13/36* (2006.01)
(52) U.S. Cl. .......................... 710/306; 710/305; 710/3
(58) Field of Classification Search ........ 710/305–306, 710/312, 126, 8
See application file for complete search history.

(56) References Cited

U.S. PATENT DOCUMENTS

| | | | |
|---|---|---|---|
| 3,988,714 A | 10/1976 | Bardotti | |
| 5,341,480 A | 8/1994 | Wasserman et al. | |
| 5,404,532 A | 4/1995 | Allen et al. | |
| 5,455,915 A | 10/1995 | Coke | |
| 5,469,463 A | 11/1995 | Polich et al. | |
| 5,546,546 A | 8/1996 | Bell et al. | |
| 5,602,998 A | 2/1997 | Alferness et al. | |
| 5,632,021 A | 5/1997 | Jennings et al. | |
| 5,751,975 A | 5/1998 | Gillespie | |
| 5,761,461 A | 6/1998 | Neal et al. | |
| 5,771,387 A * | 6/1998 | Young et al. | 710/260 |
| 5,822,583 A | 10/1998 | Tabuchi | |
| 5,892,933 A | 4/1999 | Voltz | |
| 6,018,526 A | 1/2000 | Liu et al. | |
| 6,026,352 A | 2/2000 | Burns et al. | |
| 6,044,207 A * | 3/2000 | Pecone et al. | 710/314 |
| 6,092,138 A | 7/2000 | Schutte | |
| 6,145,009 A | 11/2000 | Miyazawa et al. | |
| 6,182,178 B1 | 1/2001 | Kelley et al. | |
| 6,205,147 B1 * | 3/2001 | Mayo et al. | 370/397 |
| 6,212,676 B1 | 4/2001 | Seaman et al. | |
| 6,233,635 B1 | 5/2001 | Son | |
| 6,260,092 B1 * | 7/2001 | Story et al. | 710/315 |
| 6,397,268 B1 * | 5/2002 | Cepulis | 710/8 |

(Continued)

FOREIGN PATENT DOCUMENTS

EP    0 607 733    7/1994

(Continued)

OTHER PUBLICATIONS

Deleganes, Ellen, "Using InfiniBand Architecture to Optimize Cache Fusion in Oracle 9 Real Application Clusters (RAC)", 2001, intel.

(Continued)

*Primary Examiner*—Rehana Perveen
*Assistant Examiner*—Kim T. Huynh
(74) *Attorney, Agent, or Firm*—Kudirka & Jobse, LLP

(57) ABSTRACT

A special bus master, called a configuration host, "walks" a bus system to discover the bus topology and bus bridges that form that topology. Once the bridges have been located, the configuration host assigns a bridge ID to each bridge and enters information into internal bridge registers that control the flow of information between bus segments. The configuration host also populates an address bitmap in each bridge in order to complete the bus system configuration. In one embodiment, the bus topology is a tree configuration and the configuration host performs a recursive procedure that configures each branch of the tree. During this configuration process the internal bridge registers and address bitmap in each bridge are populated.

34 Claims, 19 Drawing Sheets

U.S. PATENT DOCUMENTS

| | | | |
|---|---|---|---|
| 6,542,953 B1 * | 4/2003 | Porterfield | 710/305 |
| 6,591,322 B1 | 7/2003 | Ervin et al. | |
| 6,594,712 B1 | 7/2003 | Pettey et al. | |
| 6,625,675 B1 | 9/2003 | Mann | |

FOREIGN PATENT DOCUMENTS

| WO | WO 94/14121 | 6/1994 |
|---|---|---|
| WO | WO 09/34376 | 8/1998 |
| WO | WO 02/10933 | 2/2002 |

OTHER PUBLICATIONS

Philips, "12C Bus Repeater, Data Sheet", Mar. 7, 2001, p.
Anonymous, "Identical 12C Components Sharing a Unique 12C Address", Sep., 1998, p. 1245.

* cited by examiner

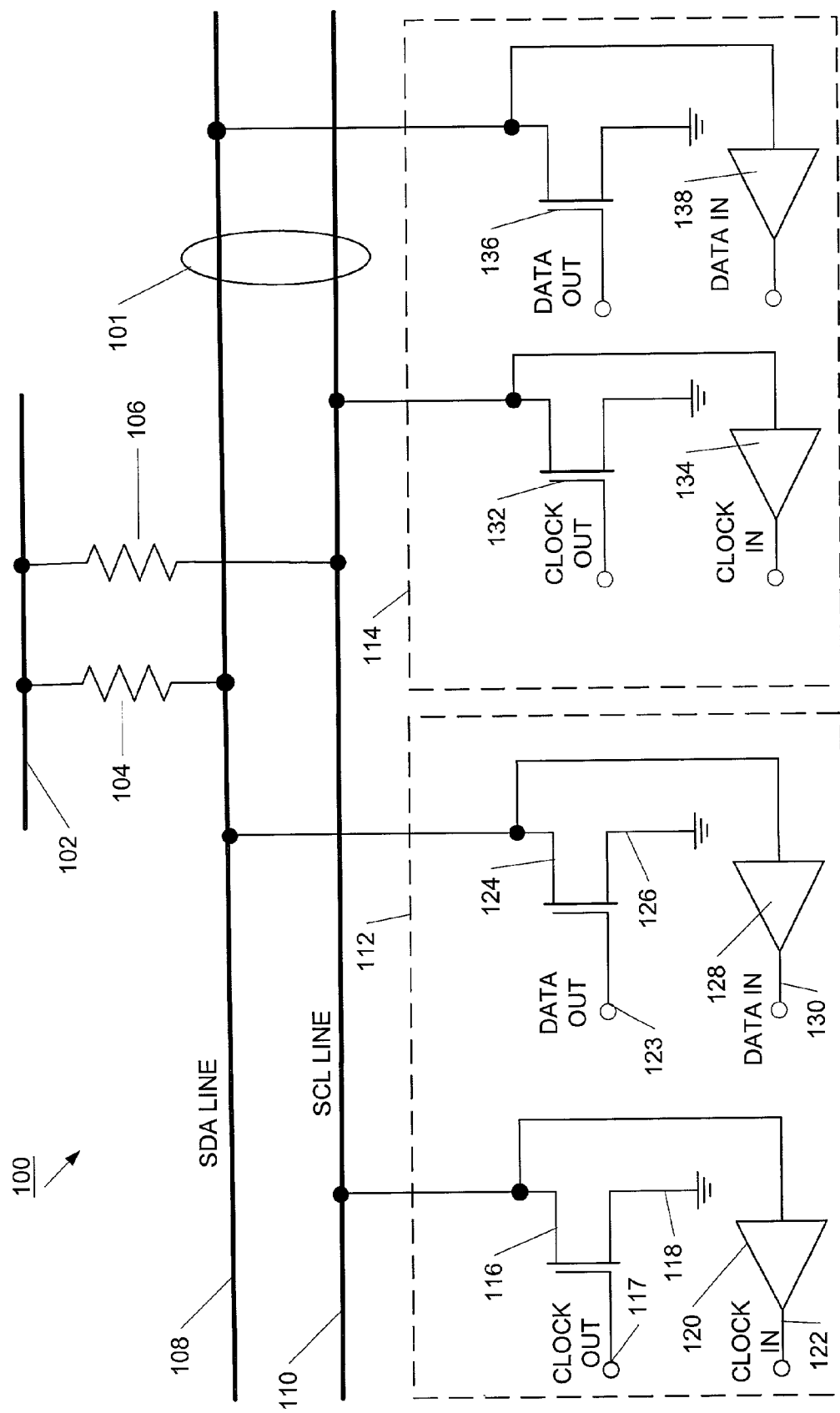
FIG. 1 *(PRIOR ART)*

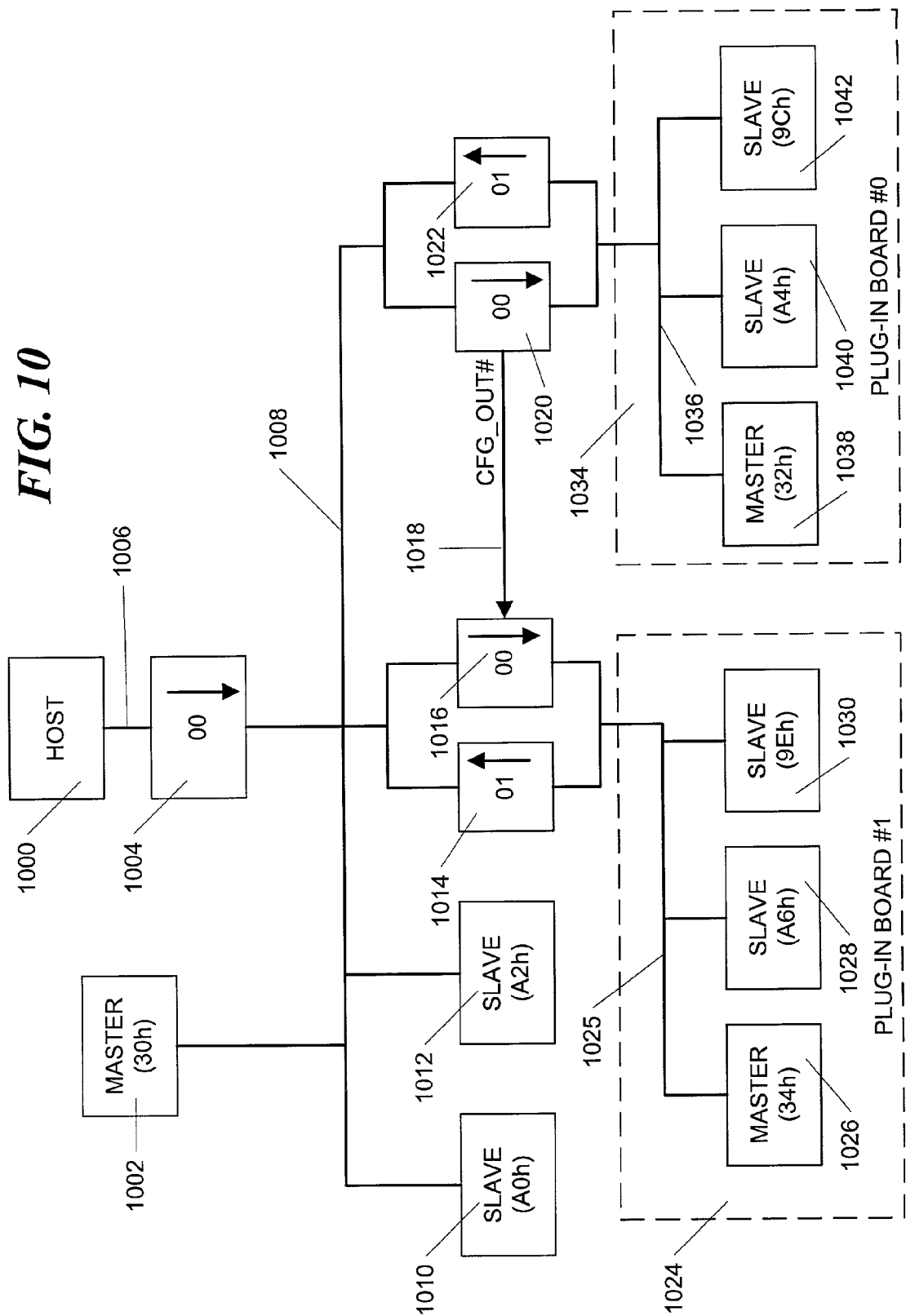

METHOD AND APPARATUS FOR CONFIGURING MULTIPLE SEGMENT WIRED-AND BUS SYSTEMS

FIELD OF THE INVENTION

This invention relates to buses using a wired-AND protocol and, more particularly, to methods and apparatus for automatically configuring bus systems having two or more bus segments.

BACKGROUND OF THE INVENTION

The I²C bus system is an electronic bus for carrying commands and data between compatible devices connected to the bus. The system was developed and marketed by Philips Semiconductor Corporation and is described in detail in the I²C Specification, revision 2.0, Philips Semiconductor Corporation 1998, which specification is hereby incorporated by reference in its entirety. In the I²C bus system, two wires, called a serial data (SDA) line and serial clock (SCL) line, carry information between the devices connected to the bus. Both the SDA and SCL lines are bi-directional lines, connected to a positive supply voltage via pull-up resistors as shown in FIG. 1 to form a "wired-AND" configuration. For example, in the bus configuration 100 illustrated in FIG. 1, the SDA line 108 and the SCL line 110 are connected to the $V_{DD}$ supply line 102 by pull-up resistors 104 and 106, respectively. Other buses, which use a similar protocol, include the SMBus, Access.bus and the InfiniBand[SM] management link. Collectively, this type of bus system will be termed a "wired-AND" bus system. The remainder of the discussion will focus on the I²C bus system with the understanding that the discussion applies to these other bus systems as well.

When the bus 101 is free, both the SDA line 108 and the SCL line 110 are pulled to a "HIGH" state by the resistors 104 and 106. The output stages of devices connected to the bus must have an open-drain or open-collector in order to form the wired-AND configuration. Two devices 112 and 114 are shown schematically in FIG. 1. Device 112 has a clock output stage which includes output transistor 116 which is connected across the SCL line 110 and ground 118. When a signal on the gate 117 of transistor 116 turns the transistor on, it pulls the SCL line 110 "LOW." Clock signals on the SCL line 110 can be detected by means of buffer 120 whose output forms the "clock in" line 122.

Similarly, device 112 has a data output stage which includes output transistor 124 which is connected across the SDA line 108 and ground 126. When a signal on the gate 123 of transistor 124 turns the transistor on, it pulls the SDA line 108 "LOW." Data signals on the SDA line 108 can be detected by means of buffer 128 whose output forms the "data in" line 130. Device 114 also has a clock output transistor 132 and clock input buffer 134 and a data output transistor 136 and data input buffer 138 for communication with the SDA and SCL lines, 108 and 110.

Devices on the bus communicate by periodically pulling the SDA and SCL lines 108 and 110 LOW producing data and clock pulses on the lines 108 and 110. In accordance with the I²C protocol, the data on the SDA line 108 must be stable when the clock line SCL 110 is HIGH. Thus, the HIGH or LOW state of the data line 108 can only change when the clock line 110 is LOW. Two unique situations arise, which situations are defined as START and STOP conditions. In particular, a HIGH to LOW transition on the SDA line 108 while the SCL line 110 is HIGH is defined as a START condition. A LOW to HIGH transition on the SDA line 108 while the SCL line 110 is HIGH is defined as a STOP condition.

Each device 112,114 on the bus 101 has a unique address and can operate as either a data transmitter or a data receiver, depending on the function of the device. For example, an LCD driver is always a data receiver, whereas a memory can both receive and transmit data. In addition to being transmitters and receivers, devices can also be bus masters or slaves when performing data transfers. A bus master is the device that initiates a data transfer on the bus, generates the clock signals required for that transfer and terminates that data transfer. During this transfer, any other device to which data is sent, or from which data is received, is considered a slave. The bus master may transmit data to a slave or receive data from a slave. In both cases, the clock signals are generated by the bus master. Bus master and slave relationships are not permanent and depend on which device initiated the data transfer at a given time.

More than one bus master device can be connected to bus 101. Bus implementations with exactly one device capable of acting as a master are called single-master buses, while those with two or more devices capable of acting as bus masters are called multimaster buses. In a single-master bus system, the I²C protocol is very straightforward, with every transaction consisting of a START condition followed by one or more address and data phases, followed by a STOP condition. Thus, the START and STOP conditions frame all activity on the bus and hence define the duration during which the bus is busy.

A slave device responds to an address or data phase generated by the master with either an acknowledgement (ACK) or a negative-acknowledgement (NAK) response. An ACK response is represented as a LOW signal level on the SDA line 108 during the acknowledge bit time, which is defined as the ninth clock pulse of any address or data phase. A NAK response is represented as a HIGH signal level on the SDA line 108 during the acknowledge bit time. Since the I²C bus is a wired-AND configuration where the buses are always HIGH unless pulled LOW by a device, a NAK response is equivalent to no response from a slave device. A NAK response during an address phase may indicate that the slave device is busy and unable to accept I²C transactions at this time, that it is non-functional or simply missing.

While a simple single-master system using the I²C technology works well, the situation becomes much more complicated when much larger and more complex I²C subsystems involving multiple unique master devices and dozens of slave devices on a single bus are constructed. Perhaps the biggest challenge in the design of any large multi-master I²C subsystem is the difficulty of ensuring reliable operation in the presence of multiple master implementations designed by different vendors. Since most I²C devices are used in simple single-master bus implementations, many available I²C master devices which claim to support multi-master operation have not been tested and verified sufficiently to be used together reliably on a single I²C bus. Furthermore, the wired-AND nature of the I²C bus means that a failure of any one device can cause the entire bus to fail, leading to difficulties in isolating the cause and nature of the fault that caused the bus failure.

In addition, one of the fundamental signal integrity challenges in any large I²C system design is meeting the rise-time specification of one microsecond on the SDA and SCL signals. Because these are open-collector signals, usually with a simple pull-up resistor to the supply rail, the rise time is proportional to the total capacitance on the bus.

Further, the strength of the pull-up resistor is limited by the maximum current that the output cells on I²C components can sink, which is stated in the aforementioned I²C specification as 3 ma. Thus, the total capacitance that an I²C bus segment can tolerate is approximately 400 picofarads, beyond which the rise-time specification cannot be met. These design constraints limit both the number of master and slave devices on the bus as well as the physical length of the bus, making large I²C system designs very challenging.

One method to avoid the aforementioned problems is to break the bus system up into a plurality of bus segments that are interconnected by a set of bus bridges. The bridges can be individually addressed by the bus masters by means of unique bridge IDs and can be programmed to selectively pass data and commands between the bus segments.

However, the bridge IDs must be properly assigned to each bridge in order for the bus system to function properly. In a large and complex bus system, assigning the bridge IDs in order to configure the system can be a complex and tedious task.

Therefore there is need for a method and apparatus to configure a segmented bus system with arbitrary complexity in order to reliably construct complicated I²C systems.

SUMMARY OF THE INVENTION

In accordance with the principles of the invention, a special bus master, called a configuration host, "walks" the bus system to discover the bus topology and the bus bridges that form that topology. Once the bridges have been located, the configuration host assigns a bridge ID to each bridge and enters information into internal bridge registers that control the flow of information between bus segments. The configuration host also populates an address bitmap in each bridge in order to complete the bus system configuration.

In one embodiment, the bus topology is a tree configuration and the configuration host performs a recursive procedure that configures each branch of the tree. During this configuration process the internal bridge registers and address bitmap in each bridge are populated.

In another embodiment, all bridges are set to a predetermined bridge ID upon reset and the configuration host successively configures each bridge by sending commands and data to the predetermined bridge ID. In this embodiment, all bridges on the same hierarchical level are connected so that only one bridge at a time responds to the predetermined bridge ID.

In yet another embodiment, at least some of the bridges are bi-directional bridges comprised of two unidirectional bridges connected in parallel. In this arrangement, the two unidirectional bridges are given different bridge IDs by the configuration host.

In still another embodiment, the configuration host also provides additional information to each bridge to enable the bridge to operate with a deterministic arbitration protocol.

BRIEF DESCRIPTION OF THE DRAWINGS

The above and further advantages of the invention may be better understood by referring to the following description in conjunction with the accompanying drawings in which:

FIG. 1 is a schematic electrical diagram of the conventional I²C bus system illustrating the manner of driving information onto the bus system and receiving information from the bus system.

FIG. 10 is a block schematic diagram showing an exemplary system that is configured in accordance with the procedure set forth in FIGS. 9A and 9B.

DETAILED DESCRIPTION

Figure 2A:
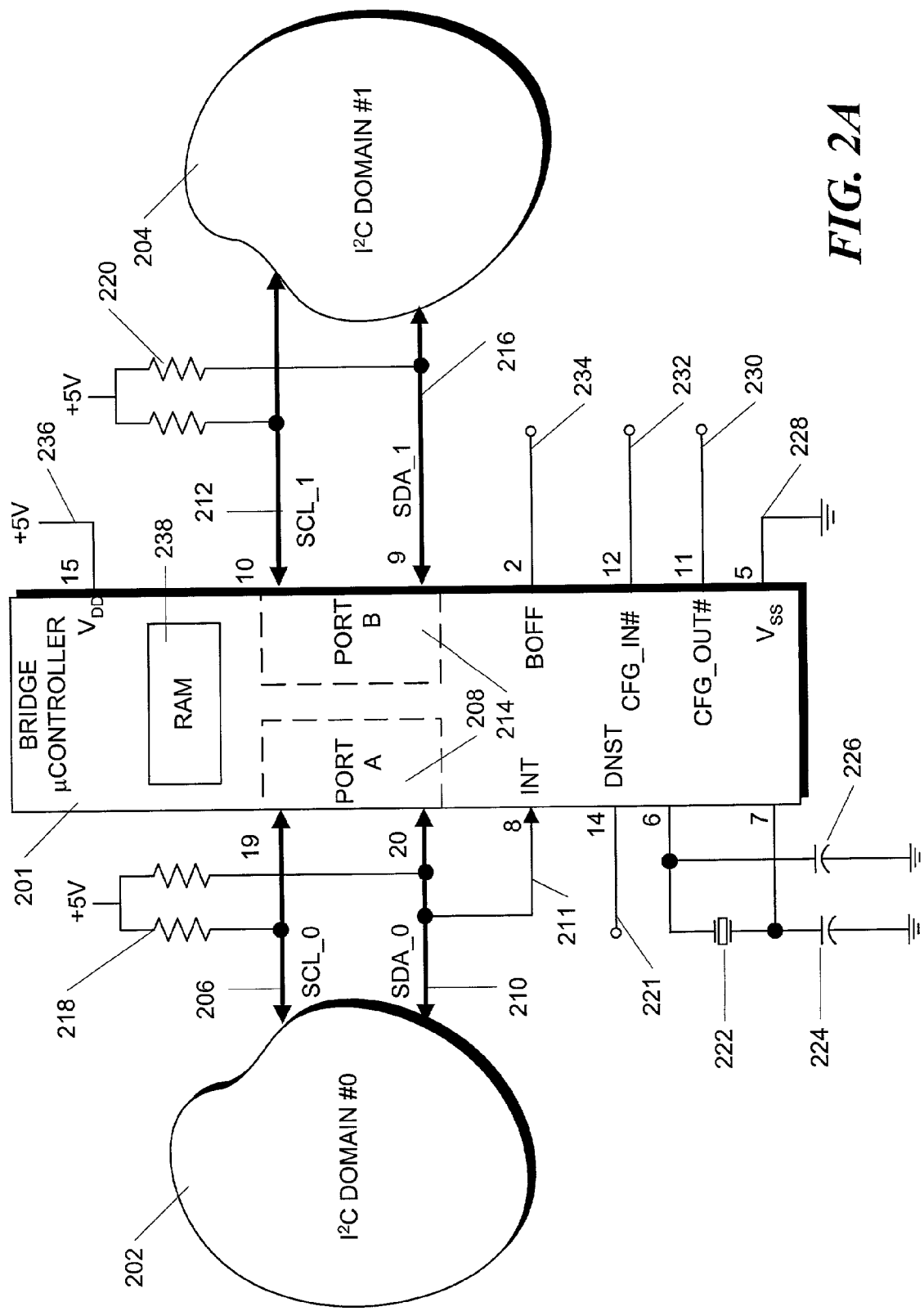
FIG. 2A is a detailed block schematic diagram of an inventive unidirectional bridge apparatus implemented with a microcontroller and connected between two I²C domains.

The invention concerns a bus bridge apparatus and method that buffers I²C transactions generated on one I²C bus by a bus master and retransmits the transactions on another bus segment. During this retransmission, the I²C address may also be filtered and translated. In one embodiment, the bridge is implemented by one or more unidirectional devices; there are several different configurations in which the bridge devices can be used. For example, a single bridge device could be used to provide electrical isolation and loading isolation between two I²C domains where the transaction flow from one domain to the other is always unidirectional. Alternatively, multiple bridge devices could be placed as "peers" on a top-level bus with the system's main I²C controller, connecting to a set of downstream I²C buses, thus implementing a tree topology.

In a single unidirectional bridge application, two I²C domains are separated by a bridge constructed, as described below, with a single microcontroller chip. Since the bridge constructed in this manner is a unidirectional bridge, transactions may pass only in one direction—from a port-A side of the bridge to a port-B side. However, the direction of data flow can be bi-directional, allowing both reads and writes. Used in this manner, the bridge device can act as a sort of "firewall." For example, suppose an I²C implementation contains multiple masters, and one of these masters is not multimaster capable. By placing the nonmultimaster-capable master by itself on the port-A bus, and connecting the other masters and all slave devices on the port-B bus, the nonmultimaster device on the port-A bus would be able to communicate with all the devices on the port-B bus (through the bridge), but would be freed from the burden of handling the many complexities of multimaster I²C. A detailed disclosure of a firewall device constructed in this manner is set forth in U.S. patent application Ser. No. 09/630,099, entitled METHOD AND APPARATUS FOR CONNECTING SINGLE MASTER DEVICES TO A MULTIMASTER WIRED-AND BUS ENVIRONMENT, filed on Aug. 1, 2000 by Joseph J. Ervin and Jorge E. Lach, the disclosure of which is hereby incorporated by reference in its entirety.

As discussed above, in a preferred embodiment, the bridge device is implemented in a programmable microcontroller, but other implementations are possible. A microcontroller, which is suitable for use with the invention, is the device 87LPC764, manufactured and sold by Philips Semiconductor Corporation. This controller is programmed with firmware, and hence the preferred embodiment is a combined hardware and software implementation. In addition to other hardware resources, this microcontroller has one multimaster I²C interface. Clearly, however, the inventive apparatus needs two I²C interfaces to fulfill its function as a bridge. Thus, the microcontroller's built-in I²C interface is used for the port-B bus and the port-A bus is implemented using two General Purpose Input/Output (GPIO) pins on the microcontroller and a software "bit-bang" driver.

FIG. 2A shows how a microcontroller 201 is used to connect two I²C domains 202 and 204. The 87LPC764 controller 201 includes 4 KB of One-Time-Programmable (OTP) internal memory that is used as program code space. Thus, the bridge software is embedded within the 87LPC764 controller 201. The 87LPC764 controller 201 runs with a 20 MHZ input clock provided by crystal 222 and capacitors 224 and 226, and has an internal machine cycle which is $\frac{1}{6}^{th}$ of the input clock, or approximately 3.3 MHz. The pin numbers of the 87LPC764 controller are denoted next to their respective leads. Power is applied to pin 15, via lead 236, and ground is applied to pin 5, via lead 228.

The 87LPC764 microcontroller 201 includes one multimaster-capable I²C interface. In the present application, this port is reserved for the port-B interface 214. This I²C interface presents the software running on the 87LPC764 with a 1-bit wide data path onto the I²C bus, so software must interact with the register interface on a bit-by-bit basis. Although this requires more software to drive the I²C interface than with byte-oriented I²C devices, the bit-oriented interface is actually preferred in that it allows software a much finer level of control over the bus 212, 216. This is particularly useful during bus recovery procedures after a fatal protocol error that causes the bus to hang.

The port-A interface 208 receives transactions from the I²C domain #0 202 via the SCL_0 and SDA_0 lines 206 and 210 that are normally held HIGH by resistor pair 218. The port-B interface 214 drives the SCL_1 and SDA_1 lines 212 and 216 that are normally held HIGH by resistor pair 220 and communicate with I²C domain #1 204.

In order to reliably detect new START conditions on the port-A interface 208 while finishing up the end of a previous I²C transaction on the port-B interface 214, the port-A SDA_0 line 210 is connected to the microcontroller 201 external interrupt input on pin 8, via lead 211, in addition to being connected to the appropriate port-A GPIO pin 20. This interrupt is enabled only when the port-A bus 206, 210 is not busy, i.e. immediately after a reset, and between STOP and START conditions on the port-A bus 206, 210. Thus, the initial START condition of any port-A transaction is detected via this interrupt mechanism, while all other port-A activity for the remainder of a transaction is detected via polling.

The bridge apparatus also incorporates an array located in RAM 238. The array is used as an address bitmap indicating which I²C addresses reside on the port-A interface and which are on port-B interface, thereby permitting the bridge to implement address replication and filtering. Address replication and filtering involves receiving an address from a first bus segment and selectively transmitting the address on another bus segment under control of the address bitmap. Replication of slave addresses may be useful, for example, if a system implementation includes multiple masters, each with some number of identical slave devices. Replication can be used, for example, in a system with two intelligent masters, each with an identical I²C EEPROM device used for local nonvolatile storage. If the masters never need to communicate directly with the EEPROM of the other master, the system can be implemented with two I²C bus segments connected by a bi-directional bridge implemented as discussed below. By configuring the address bitmaps in the bridge correctly, the addresses of the EEPROM devices could be local to each bus segment, but the masters could still communicate with one another. Furthermore, any devices that have unique addresses could be placed on either segment, with access from the remote master provided through the bridge.

Figure 2B:
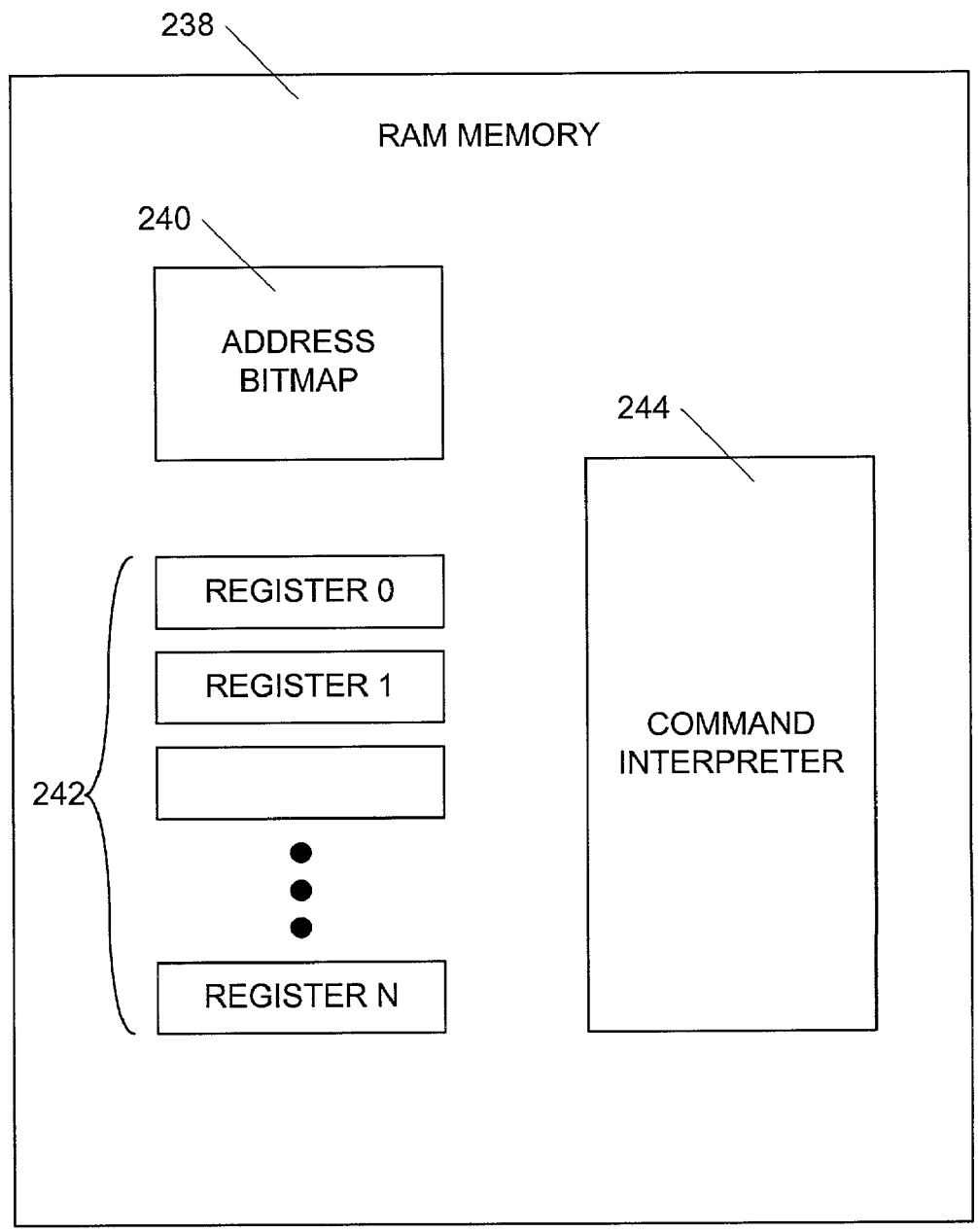
FIG. 2B is a block schematic diagram of the some of the contents of the RAM memory in the microcontroller of FIG. 2A.

FIG. 2B shows some of the contents of the RAM 238 including the address bitmap 240 and a set of internal registers 242 that are described in detail below. Also included is a command interpreter 244, which receives and parses commands addressed to the bridge. This interpreter would normally be implemented in firmware and its operation is discussed in detail below.

The address filter bitmap comprises 32 bytes. Each of the 32 bytes, in turn, comprises 256 bits, which gives one bit per I²C address. Using this bitmap, a special master called a "configuration host" can control on an address-by-address basis, which addresses are ignored by a given bridge, and which are forwarded transparently from the port-A bus to the port-B bus. The operation of the configuration host and the manner in which it controls the bridges is discussed in detail below.

The relationship between bits in the bitmap and I²C address is that first byte in the bitmap maps I²C addresses 00h through 07h ("h" stands for hexadecimal notation), with bit<0> corresponding to address 00h, bit<1> corresponding to I²C address 01h, and so on. In accordance with conventional I²C specifications, even numbered bits correspond to write addresses, and odd numbered bits correspond to read addresses. In order to address a bridge itself, the address is either 62h or 63h depending on whether the transaction is a write or read.

The bridge will forward a transaction if the corresponding bit in the bitmap is a "1." However, the address filtering mechanism will not pass transactions addressed to the bridge's own I²C address of 62h or 63h. These addresses, however, may be reached on the other side of a bridge through a procedure called "transaction tunneling" that is discussed in detail below. Transaction tunneling allows a master to send a special command to a bridge address. The command contains another address. When a bridge receives this command it transmits the command to the address contained within the command. This arrangement allows software on a configuration master, for example, to tunnel a transaction through a bridge to probe for other bridges.

The transaction tunneling mechanism provides a way for masters to communicate with devices on remote segments if the devices have addresses identical to a device on the masters local segment. For example, in some system implementations, it may be necessary to have multiple I²C devices at the same addresses and for one or more masters in the system to be able to uniquely access each of these devices. One such anticipated application of this type will be a computer chassis containing InfiniBand^SM expansion slots for plug-in Target Channel Adapters (TCAs). All TCA cards are required to have a number of specified slave devices such as temperature sensors and EEPROM devices, and an intelligent master device. The addresses of these devices are identical from TCA to TCA. The InfiniBand^SM application requires that the I²C master in the chassis communication with each TCA, and for at least one TCA per chassis communicate with the host I²C master in the chassis. Furthermore, the TCA cards are all hot pluggable, meaning that they may be plugged in while the chassis is powered up, and possibly while I²C activity is present on the host's bus segment.

The transaction tunneling mechanism allows a system designer to accommodate, for example, multiple plug-in cards or devices that include I²C slaves at the same addresses. By placing each of these plug-in devices behind a bridge, any master anywhere in the system can communicate specifically with any of these identically addressed slave devices. Furthermore, if bi-directional bridges are used, then each of the plug-in devices can also communicate through the bridge with any devices elsewhere in the system. When an I²C master wishes to communicate with a device behind a bridge via tunneling, it simply formats a message directly to the bridge indicating in the body of the message the address of the device with which it wants to communicate.

In addition, each bridge contains a number of internal registers located in the RAM 238 that are used by a configuration host to configure all the bridges in the bus hierarchy after coming out of a reset condition. These registers may also be used to enable and disable certain features of a bridge, such as whether address filtering is in use.

Figure 3A:
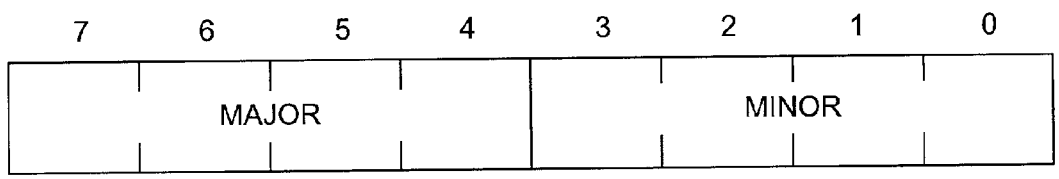
FIGS. 3A–3I shown the contents of various registers in the bridge apparatus.

The set of the internal registers is shown in FIGS. 3A–3I. The registers are accessed via special I²C transactions that are described below. The REVISION register, shown below in FIG. 3A, provides an indication of the revision of the bridge chip itself to software running on the configuration host. This information may be used to take advantage of features or changes on a revision-by-revision basis. Bits 7 to 4 indicate the major release level, and bits 3 to 0 indicate the minor release level. For example, a revision of 1.7 would be indicated by a hexadecimal value of 17h.

Figure 3B:
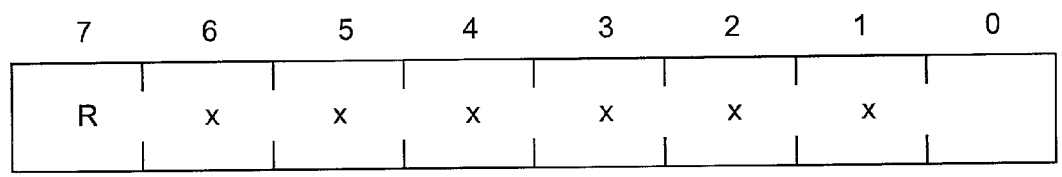

The RESET register, shown in FIG. 3B, can be used to initiate a software reset of the bridge circuit. Writing to this register with bit 7 equal to "1" will cause the bridge to undergo a full reset, equivalent to the assertion of the RESET input pin on the chip itself.

Figure 3C:
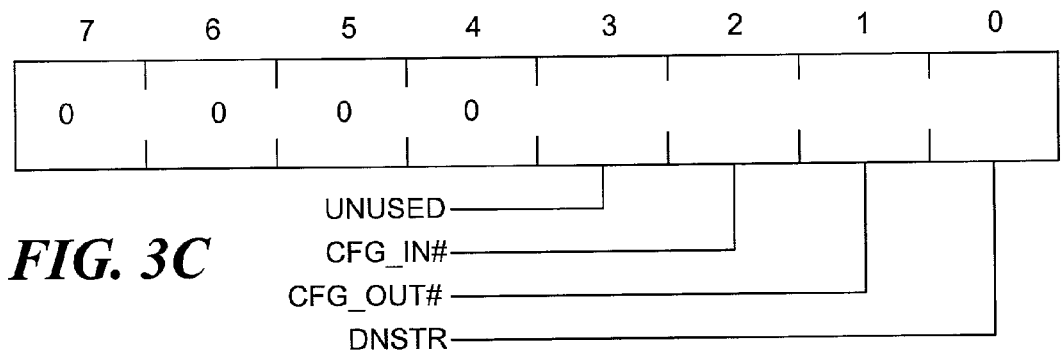

The STATUS register, shown in FIG. 3C, provides the configuration host with visibility into the status of several of the pins on the bridge chip. This register is read-only—writes have no effect. Bits 7 to 4 are unused and always read as zero.

Figure 3D:
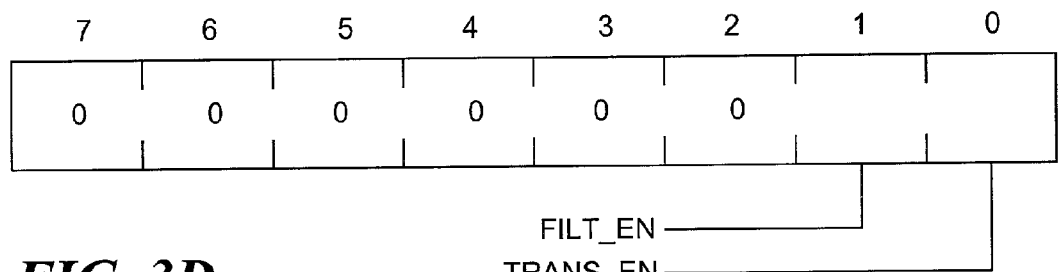

The FLTR_CTL register, shown in FIG. 3D, allows the configuration host to select between three distinct modes of operation with regard to address filtering, controlled by the FILT_EN and TRANS_EN bits. The FILT_EN and TRANS_EN bits are cleared by a hardware or software reset. The three modes of operation are given below in Table 1.

TABLE 1

| TRANS_EN | FILT_EN | Description |
|---|---|---|
| 0 | 0 | Disabled. No addresses forwarded to Port-B bus. |
| 0 | 1 | Normal. Addresses filtered based on address bitmap. |
| 1 | X | Fully transparent. All addresses passed to port-B, except the bridge address 62h. |

The description of each mode is given in the last column of the table. The transparent mode is equivalent to setting all the bits in the address bitmap and then enabling address filtering. This mode of operation is provided to simplify bridge configuration when the bridge is used being used in a "firewall" application.

Figure 3E:
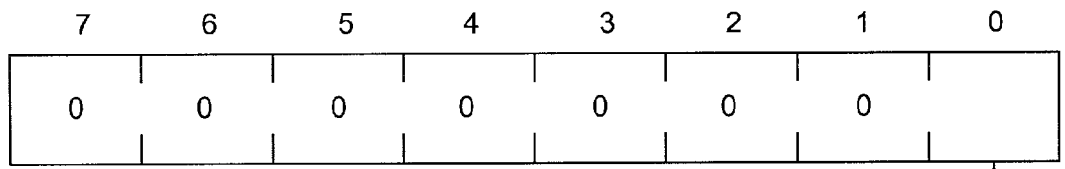

The DA_CTL register, shown in FIG. 3E, allows the configuration host to control whether a given bridge implements a deterministic arbitration (DA) protocol, as described in U.S. Pat. No. 6,175,887 and discussed below. This register consists of a single bit, which when written to "1", enables the DA protocol, utilizing the arbitration ID given in the DA_ID register. The DA_EN bit is cleared by a hardware or software reset.

Figure 3F:
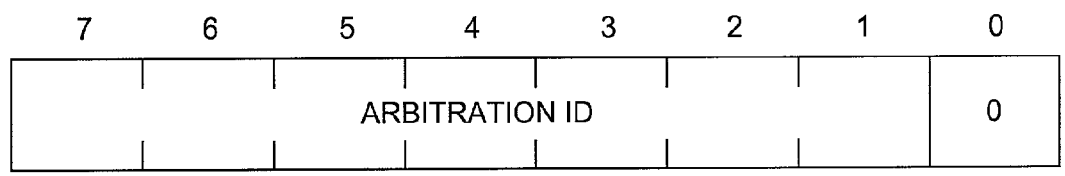

The DA_ID register, shown in FIG. 3F, is used by the configuration host to program the ID driven by this bridge on its port-B bus when it is configured to use the DA protocol. The contents of this register are initialized to 20h at reset. Only bits 7 to 1 are programmable; bit 0 is forced to a "0" to ensure that the ID corresponds to a write address. Software on the configuration host should program this register with the desired arbitration ID.

Figure 3G:
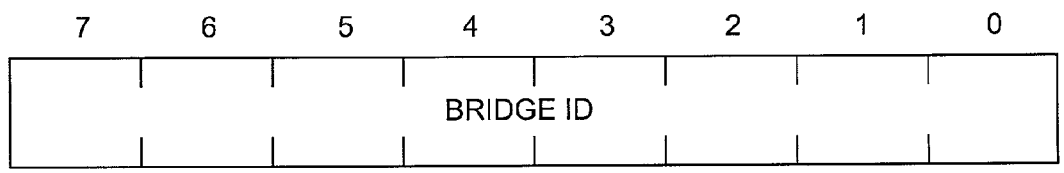

The BR_ID register, shown in FIG. 3G, is the location where the configuration host programs the bridge ID of the bridge containing this register. The values 00h and 01h are reserved; the bridge will ignore attempts to program these values into this register. Following a hardware or software reset, this register is reset to 00h for a downstream bridge (DNSTR pin HIGH), and to 01h for an upstream bridge (DNSTR pin LOW).

The aforementioned terms "upstream" and "downstream" refer to the location of the configuration host processor relative to the port-A bus and the port-B bus. The upstream bus is defined to be the bus with the fewest bridges in the path to the configuration host. The other bus is the downstream bus. This distinction is more apparent in larger tree configurations where there may be several levels of bus hierarchy between the configuration host and the most distant I²C devices.

The BR_ID register is used in conjunction with the CFG_IN# and CFG_OUT# pins (232 and 230, FIG. 2A) in order to allow a configuration host to configure multiple peer bridges connected to the same bus with their port-A interfaces. Peer bridges on a given bus segment are connected in a "daisy chain" with the CGF_OUT# pin of a bridge connected to the CFG_IN# of another bridge. Unconfigured downstream bridges come out of RESET with their bridge IDs set to 0. The CFG_IN#/CFG_OUT# daisy chain allows unconfigured peer bridges to determine which one of them will respond to configuration commands from the configuration host. The CFG_IN# pin is strapped LOW on the first bridge in the chain to indicate that it may respond to bridge commands addressed to bridge #0. After each bridge in the daisy chain is given a valid ID by the configuration host, it passes the LOW value to the next bridge in the chain.

Figure 3H:
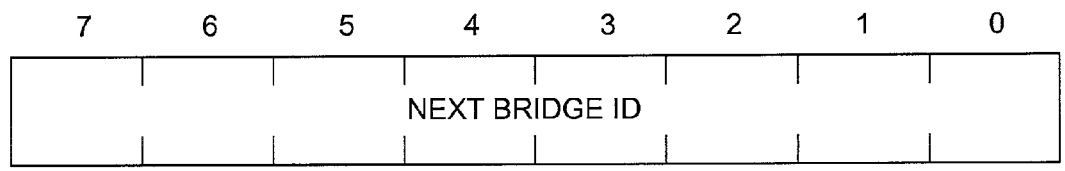

In particular, when the BR_ID register contains 00h, the bridge containing the register can respond to bridge commands only if its CFG_IN# daisy chain input 232 is LOW. When the configuration host programs this register to a valid value (not 00h or 01h) the CFG_OUT# pin 230 will automatically go LOW to pass the daisy chain signal to the next downstream bridge on this bus segment. This allows the next unconfigured bridge in the chain to respond to bridge commands from the configuration host. The UNCONFIG bridge command will return downstream bridges to an ID of 00h and upstream bridges to 01h, and will cause the CFG_OUT# pin to go HIGH The NXT_BRID register, shown in FIG. 3H, is the location where the configuration host programs the start of the range of bridge IDs that exist downstream of this bridge. The term "downstream" means in the direction of the port-B bus for a downstream bridge (DNSTR pin HIGH), and it means in the direction of the port-A bus for an upstream bridge (DNSTR pin LOW). This register is used together with the LST_BRID register to form a range of bridge IDs.

When a bridge command is received by a bridge on its port-A bus, it first checks whether the specified bridge ID matches its bridge ID as programmed in the BR_ID register. If not, then downstream bridges check to see whether the specified ID falls within the range defined by the value in the NXT_BRID register to the value (inclusive) in the LST_BRID register. If the bridge ID is within this range, the bridge forwards the transaction to its port-B bus. Similarly, upstream bridges check to see whether the specified bridge ID falls outside the range defined by the NXT_BRID and LST_BRID registers. If so, then the transaction is similarly forwarded to its port-B bus. Following a hardware or software reset, this register is set to 00h.

Figure 3I:
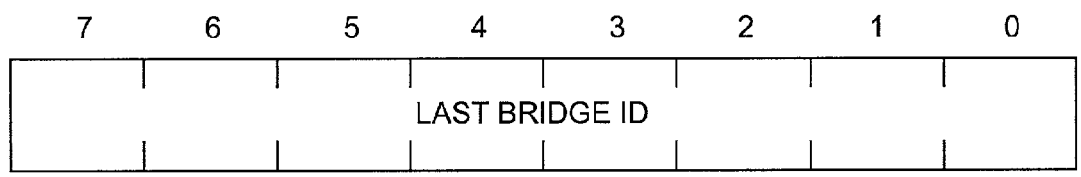

The LST_BRID register, shown in FIG. 3I, is the location where the configuration host programs the end of the range of bridge IDs that exist downstream of this bridge. Note that the term "downstream" means in the direction of the port-B bus for a downstream bridge (DNSTR pin HIGH), and it means in the direction of the port-A bus for an upstream bridge (DNSTR pin LOW). This register is used together with the NXT_BRID register to form a range of bridge IDs as discussed above. Following a hardware or software reset, this register is set to 00h.

Returning to FIG. 2A, the DNSTR pin 14 is pulled HIGH internally and, when it is left "floating", it indicates to the bridge 201 that the bridge is a "downstream bridge, i.e. its port-B interface 214 faces away from the aforementioned configuration host. As described below, the DNSTR signal is used by the bridge in conjunction with the backoff (BOFF) signal on lead 234 (generated at pin 2) to prevent a deadlock condition that can occur when two bridges are wired together to form a bi-directional bridge.

Figure 4:
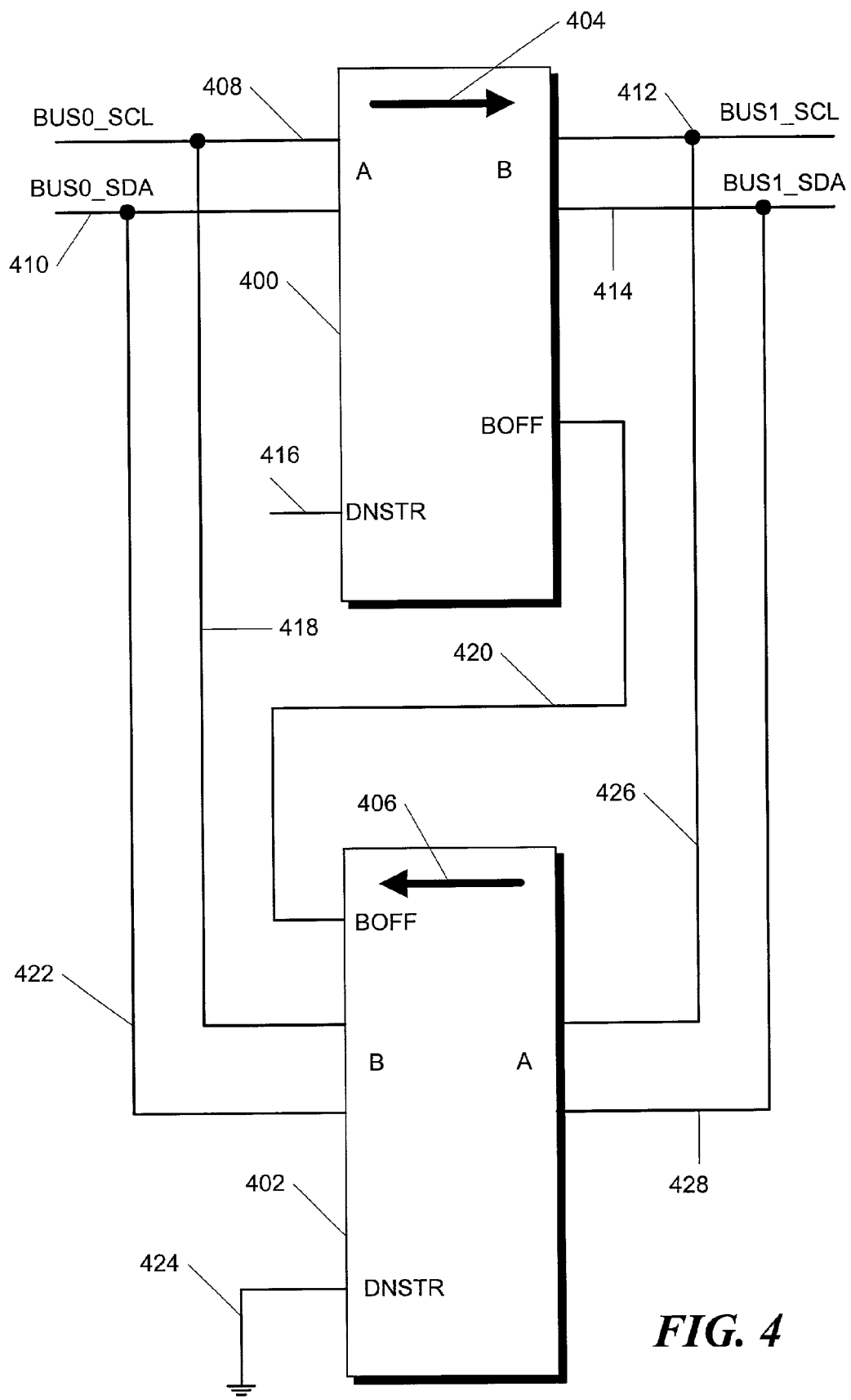
FIG. 4 is a block schematic diagram of two unidirectional bus bridge apparatus connected in parallel as a bi-directional bridge between two I²C systems.

In particular, as illustrated in FIG. 4, two unidirectional bridges 400 and 402 may be wired in parallel, transmitting transactions in opposite directions, to implement a transparent, bi-directional bridge. Bi-directional bridges can be used to allow a large multimaster I²C bus to be divided into two or more different domains, where each domain contains one or more masters and the slave devices that the masters access most frequently. By grouping related master and slave devices together in this way, multiple transactions can be in progress simultaneously between a master and its local slave devices. Thus, the aggregate throughput of the I²C system is maximized. Also, by programming the bridges to block transmission of certain addresses, a host controller can configure an I²C bus to simultaneously use the same address on different multiple bus segments, with the replicated addresses available only to bus masters that are local to that bus segment.

As shown in FIG. 4, bridge 400 transmits I²C transactions in the direction of arrow 404 and bridge 402 transmits I²C transactions in the direction of arrow 406. Bridges 400 and 402 connect two I²C buses. BUS0 represented by lines BUS0_SCL 408 and BUS0_SDA 410 is designated as the "upstream" bus and BUS1, represented by lines BUS1_SCL 412 and BUS1_SDA 414, is designated the "downstream" bus. BUS0 is connected to port-A of the bridge 400 and to port-B of the bridge 402, via lines 418 and 422. Similarly, BUS1 is connected to port-B of the bridge 400 and to port-A of the bridge 402, via lines 426 and 428.

FIG. 4 shows the wiring of the DNSTR and BOFF signals for two bridges used in a bi-directional configuration. These signals work together to prevent a "deadlock" situation that would occur if a master on BUS0 attempted to access a slave on BUS1, while, at the same time, a master on BUS1 attempted to access a slave on BUS0. Because each bridge chip will stall its port-A bus while attempting to acquire its port-B bus, there arises a situation where both buses can be stalled indefinitely. In order to give priority to the configuration host in such deadlock situations, the inventive bridges are arranged to always defer access to the downstream bridge.

For example, in the aforementioned deadlock situation, where transactions start simultaneously from masters on both sides of the bridge to slaves on opposite sides of the bridge, the bridge configured as the downstream bridge (with its DNSTR pin unconnected and floating HIGH) is constructed to drive the BOFF signal as an output to indicate that it is attempting to acquire the bus connected to its port-B interface. The upstream bridge (with its DNSTR pin tied LOW) is constructed to read the BOFF signal as an input. Thus, if the upstream bridge sees BOFF asserted HIGH while waiting to acquire the upstream bus (BUS0), it will abort the transaction by passing a NAK response back to the master on its port-A interface (BUS1).

With this operation, it is necessary for the master on BUS1 to terminate its transaction with a STOP condition so that the downstream bridge can complete the transaction. Since masters attempting transactions through upstream facing bridges may receive a NAK as a response to an address byte, they must be designed to gracefully terminate their transaction with a STOP and then retry the upstream transaction. It should be noted that there is no fairness associated with this backoff mechanism; upstream masters sending transactions downstream will always win over the downstream masters sending transactions upstream.

Any I²C system containing bridges constructed in accordance with the principles of the invention must have one or more bus masters defined as a "configuration host." In general, there will be only a single configuration host, although there may be multiple configuration hosts so long as they exist on the same bus segment. This arrangement is required because the upstream/downstream strapping of all the bridges in the system is relative to the configuration host. Thus, the configuration host must exist upstream of all bridges in the system in order for some of the configuration operations to work correctly.

For example, there is a configuration command called UNCONFIG, discussed in detail below, which is issued to all bridges simultaneously, via a broadcast addressing mechanism. Since these broadcast messages are only forwarded by downstream bridges, if there are any bridges upstream from the configuration host, they will not receive such broadcast messages.

The mechanism for all communication between an I²C master, such as the configuration host, and the inventive bridges are bridge "commands" such as those described below. In normal operation, a configuration host would use these bridge commands to discover the bus topology and to configure the address bitmaps of all bridges in the topology. Following this configuration, the configuration host can enable address filtering in all bridges (for which filtering is desired) at which point the bridges will transparently forward I²C transactions up and down through the bus hierarchy, providing transparent access to all unique slave addresses to all masters in the system. For slave addresses that are not unique, remote masters in the system may use a procedure described below and called "transaction tunneling" to request proxy access to the addressed device via the bridge connected to that device's bus on its port-B interface.

Figure 5:
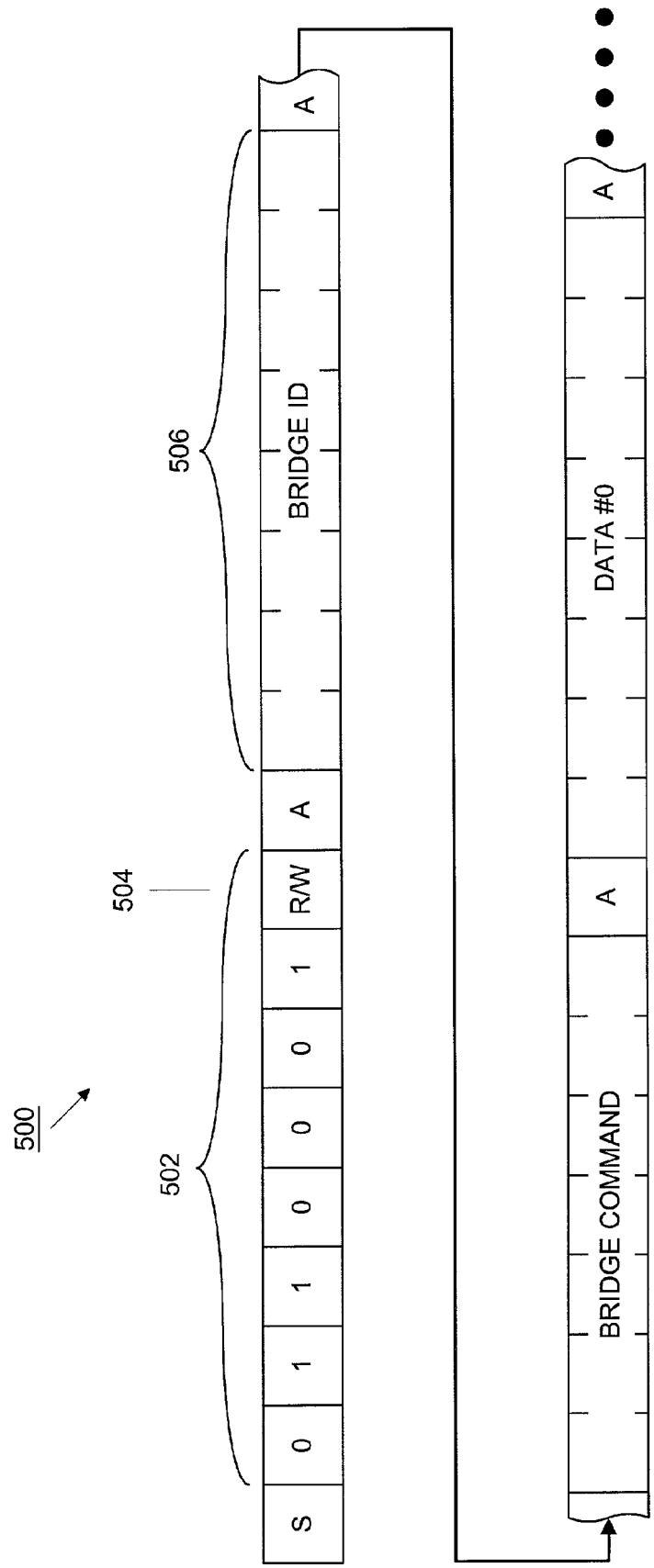
FIG. 5 is a time diagram showing the sequence of command signals generated by a bus master and used to control a bridge.

The bridge commands are specially formatted messages. The basic structure of a message 500 constructed in accordance with one embodiment is shown in FIG. 5. Although a particular message arrangement is discussed below, it would be obvious to those skilled in the art that other arrangements could also be used in order to accomplish the same results. FIG. 5 illustrates the bits of a message, as they would appear on the SDA line in time with time increasing to the right. In this transaction diagram and the following transaction diagrams, the symbol "S" indicates the I²C START condition, "Sr" indicates a repeated START, "P" indicates a STOP condition, "A" indicates a LOW level on a bus during an acknowledge bit, and "N" indicates a HIGH level during an acknowledge bit.

Like all I²C transactions, these messages start with an I²C address 502. As previously mentioned, the address used by all inventive bridges is either 62h or 63h depending on whether the transaction is a write or read. In these addresses the LOW bit 504 is a '0' for writes and a '1' for reads, in a manner similar to other conventional I²C devices. The way in which bridges are uniquely accessed is with a secondary addressing scheme called a "bridge ID." The bridge ID 506 appears as the first data byte in the I²C message 500 following the address 502. Following a hardware or software reset, all bridges are internally programmed to assume a default bridge ID of 00h for downstream bridges, and 01h for upstream bridges.

As is common among I²C devices that have internal registers, read operations are performed via an atomic write-read I²C operation. The write portion of the write-read transaction accomplishes several things. First, it provides the bridge ID byte to identify which bridge in the system is being targeted. Second, the write portion of the write/read transaction provides the bridge command byte 406, which tells the bridge what type of command the host is transmitting. Since the intended target bridge of the transaction could be on any bus segment in the system, the transaction will be forwarded throughout the bus hierarchy as required by all the bridges between the host and the target bridge.

Following the write portion of the write-read, the master device driving the transaction issues a repeated START followed by the address 63h. At this point, all bridges in the system are programmed to remember what type of operation was in progress, and to which bridge the operation was targeted. Thus, all bridges in the bus hierarchy between the master and the targeted bridge continue forwarding the transaction, just as during the write portion of the transaction. Since the logical path from the master to the target bridge is given explicitly in the write portion, and implied in the read portion, it is imperative that a master device issue a STOP condition before attempting to communicate with a different slave device. This STOP condition lets all the bridges in the system know that the operation is complete, and that they can return to normal operation.

In addition to specifying a unique bridge ID in the command syntax, the master responsible for configuring all the bridges, i.e. the configuration host, is allowed to issue a special bridge ID, called the "broadcast ID." In an illustrative embodiment, the broadcast ID is given the value FFh, and will cause the bridge command specified in the transaction to be forwarded by all downstream bridges in the system. This addressing scheme is reserved for a single command type called the UNCONFIG command, which the configuration host can use to return all bridges to their default, unconfigured state. In this state, all downstream bridges assume an ID of 00h, all upstream bridges assume an ID of 01h, and address filtering and support for other operations are disabled. The configuration host may then rediscover the bus topology and reconfigure all bridges in the system.

In order to allow a master to address a transaction to any bridge in the bus hierarchy without regard to the actual bus hierarchy configuration, each bridge knows explicitly the bridge IDs of all the bridges downstream from itself. Therefore, it can determine for each bridge command presented to its port-A interface whether the destination bridge is located upstream or downstream from itself. The mechanism that allows a bridge to determine whether it needs to forward a bridge transaction from its port-A interface to its port-B interface is based on the aforementioned register pair NXT_BRID and LST_BRID which define the range of bridge IDs that are located downstream from this bridge. The use of two registers to define a range of bridge IDs that need to be forwarded implies a certain relationship between the bus topology and the scheme used to assign IDs to bridges. This bridge ID assignment scheme is discussed below.

Figure 6:
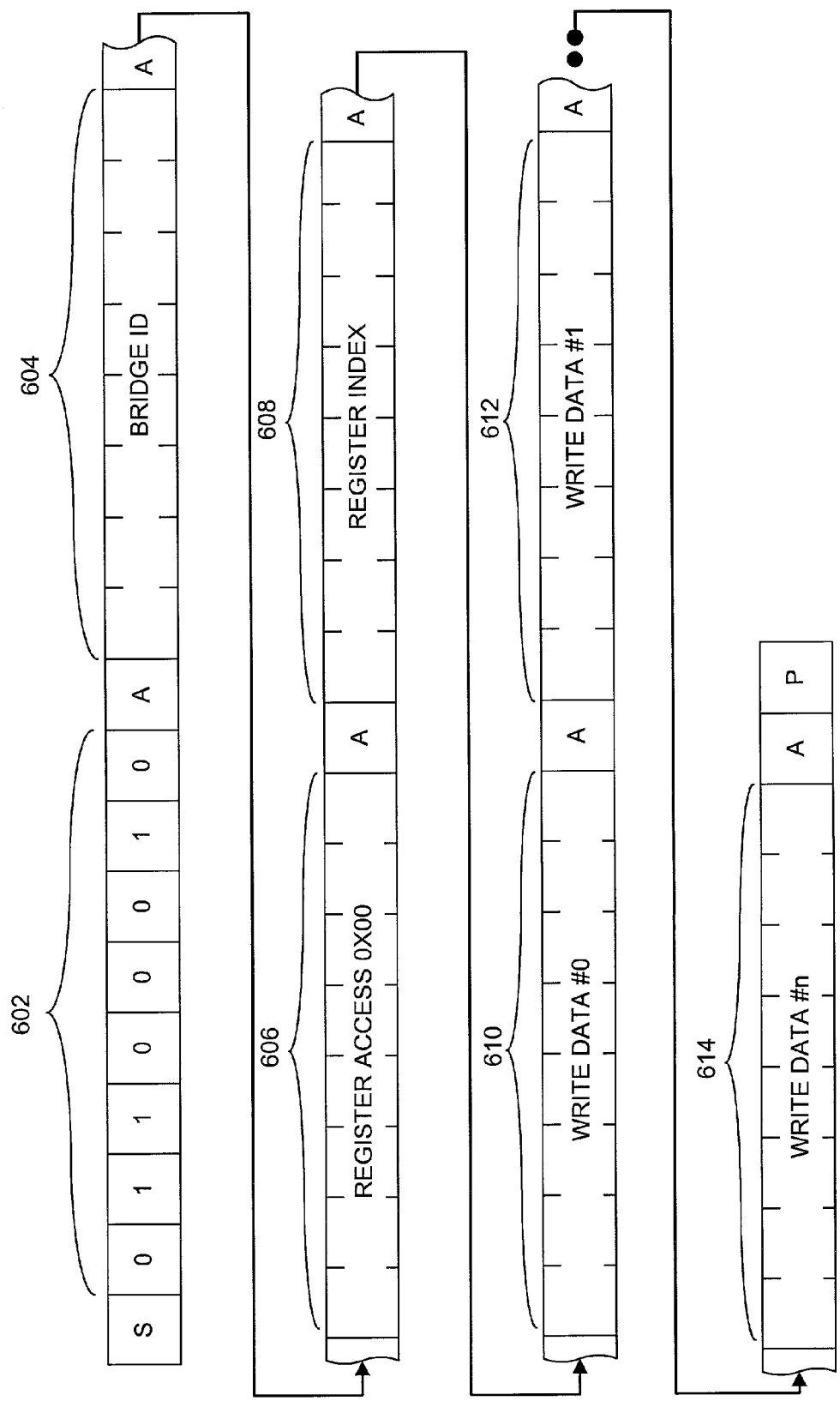
FIG. 6 is a time diagram showing the sequence of command signals generated by a bus master during a write register access bridge command.
Figure 7:
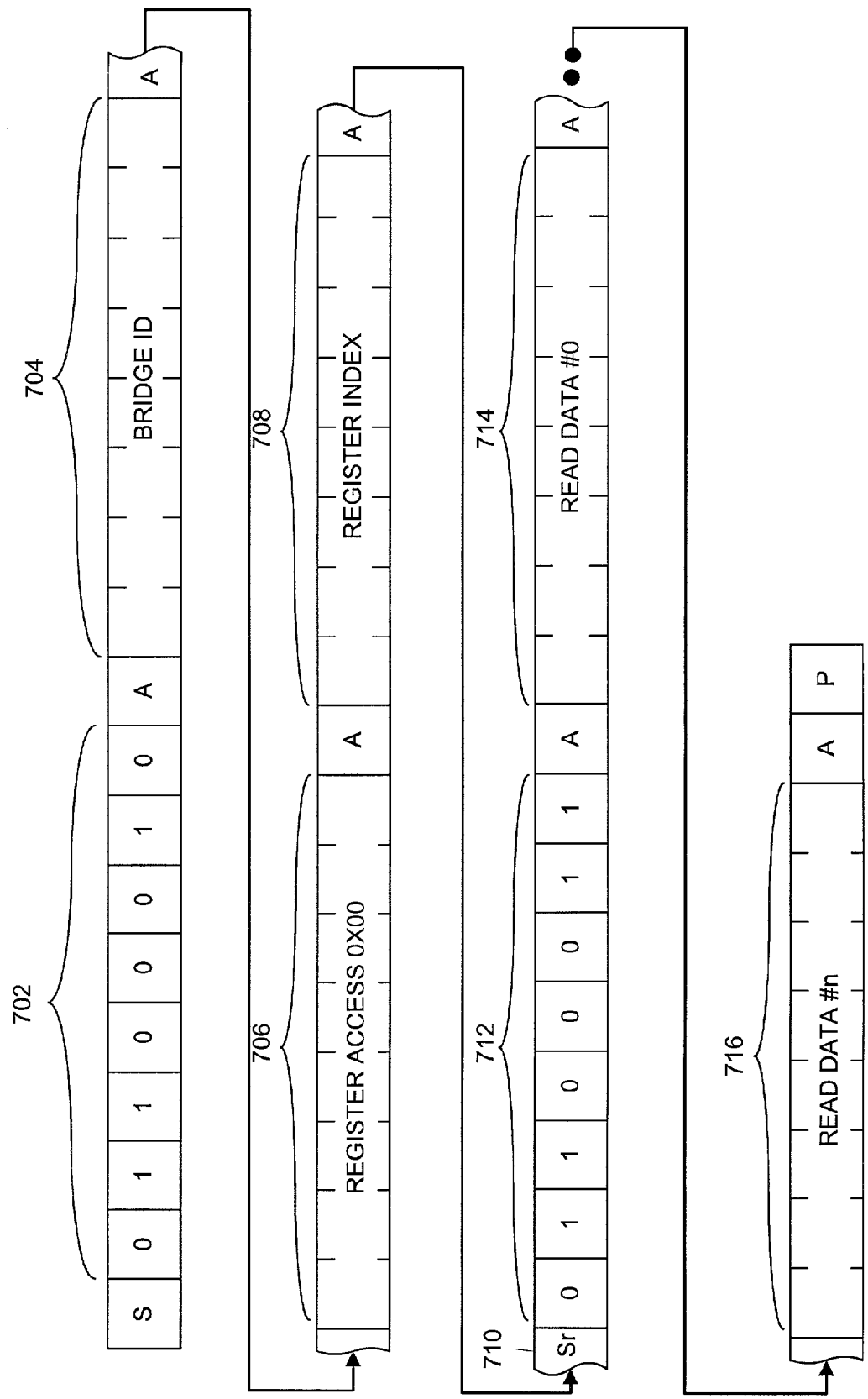
FIG. 7 is a time diagram showing the sequence of command signals generated by a bus master during a read register access bridge command.

A master can issue several command types to an inventive bridge. The first of these commands is a register access command and is issued by a master to read or write the internal registers (discussed above in connection with FIGS. 3A–3I) of a bridge. The syntax for the read and write transactions is shown in FIGS. 6 and 7 and is very similar to that used for other standard I²C components, such as a serial EEPROM. The essential difference is that the bridge transaction requires a bridge ID and a bridge command byte as the first two data bytes in the transaction.

The register access write command is shown in FIG. 6 and starts with the bridge address of 62h (602), followed by the bridge ID 604. Next, a command byte 606 of 00h is transmitted to indicate a register access command, and then the register index 608 is transmitted, followed by the byte or bytes 610–614 to be written. The writes to the internal register array are controlled by an index pointer that selects the register that is being written. The index pointer automatically increments at the end of every byte written, so that successive bytes can be written to the register array in a single transaction. This is particularly helpful when writing the address filter bitmap.

Although it is not obvious from register access transactions in FIGS. 6 and 7, when the registers of a bridge that is on a bus segment behind another bridge are accessed, the bridge transaction forwarding mechanism becomes involved. One of the artifacts of this mechanism is that the ACK bits returned to the master during the transaction actually come from different devices at different points in the transaction.

For example, when the master initiates a transaction and issues the initial bridge address of 62h, ACK bits are returned by all bridges on the same bus segment as the master. The same is true for the bridge ID byte that follows. When the command byte then is sent, all bridges, except the one that is in the path to the targeted bridge, abort the transaction, leaving only the master and a single bridge to continue the transaction. If the transaction were to a bridge on the same segment as the master, the transaction completes locally.

However, in the case of a multi-level bus topology where the target bridge is on a separate bus segment located behind a bridge on the master's bus segment, the transaction will be forwarded to the next bus along the path to the target bridge. The decision whether to forward the transaction is made by each bridge, by comparing the specified bridge ID to the range of bridge IDs defined by the NXT_BRID and LST_BRID registers. If the specified ID falls within this range, then the transaction will be forwarded by that bridge to its port-B bus. After the forwarding bridge has repeated the I²C address byte 62h, the bridge ID, and the command byte, it enters transparent mode of operation in which is simply passes bits back and forth between its port-A and port-B interfaces.

This forwarding action takes place at each level of bus hierarchy between the initiating master and the target bridge. When the target bridge has been reached, it will return an ACK signal in response to the command byte, which is passed back up the hierarchy to the initiating master. Thus, the ACK signal returning from the command byte is the first ACK in the transaction that has actually come from the bridge intended as the target of the transaction.

The register access read command is shown in FIG. 7 and starts with the bridge address of 62h (702), followed by the bridge ID 704. Next, a command byte 706 of 00h is transmitted to indicate a register access command, and then the register index 708 is transmitted. At this point during a read transaction, a repeated START condition 710 is transmitted to reverse the data direction. Following this repeated START 710, the master issues the bridge read address 712 of 63h. Note that no bridge ID or command byte is issued at this point in the transaction. Rather, all the bridges in the path to the target bridge retain enough internal state such that they can continue forwarding the transaction to the bridge specified in the write portion of the transaction. Thus, the repeated START 710 and the read address 712 of 63h are forwarded along the path to the target bridge followed by the read data bytes 714–716. The target bridge is fully unaware that the read transaction has come from a distant bus segment connected through possibly several layers of bridges, and simply returns the read data. The bridges in the active path through the hierarchy pass the read bits from the target bridge back to the initiating master, and also the ACK bits from the master back to the target bridge.

When the initiating master is finished reading bytes, it returns a NAK signal in response to the last byte as per standard I²C protocol and issues a STOP. The STOP is similarly forwarded down the path through the bus hierarchy to the target bridge, at which point the transaction has ended.

The 32 bytes in the address bitmap comprise 256 bits, which allows one bit for every possible read/write address in an eight-bit I²C address space. At the beginning of an I²C transaction, a bridge absorbs the entire 8-bit address (7-bit address plus the read/write bit) from its port-A interface and checks the corresponding bit in the address bitmap. If the bit is a '1', then the bridge will acquire the bus connected to its port-B interface and re-drive the transaction.

When the bridge receives an ACK or NAK bit from the port-B interface, it passes the bit back to the port-A interface and the proceeds with the rest of the transaction in a transparent manner, passing data and ACK/NAK bits back and forth between the two interfaces. When the port-A master terminates the transaction with a STOP condition, the bridge will, in turn, terminate the port-B transaction with a STOP.

Another set of bridge commands that can be issued by a master are "tunnel" read/write commands. Transaction tunneling is a mechanism provided by the inventive bridge to complement the address filtering mechanism. As previously described, address filtering allows the 128 possible read/write addresses of the I²C bus to be distributed arbitrarily among the bus segments of an I²C bus topology. The address bitmap of each bridge allows transactions to be forwarded as required up and down through the bus hierarchy to establish a transparent communication path between a master and the addressed slave. In some cases, however, it may be necessary for some number of slave devices to be assigned the same I²C address. In this case, by placing such slave devices on separate bus segments and using the inventive bridge to connect these segments into an I²C topology, all slave devices can be uniquely addressed. The tunnel command allows a bus master to bypass the internal address bitmap in a bridge and directly specify which address will be driven by the bridge.

Figure 8:
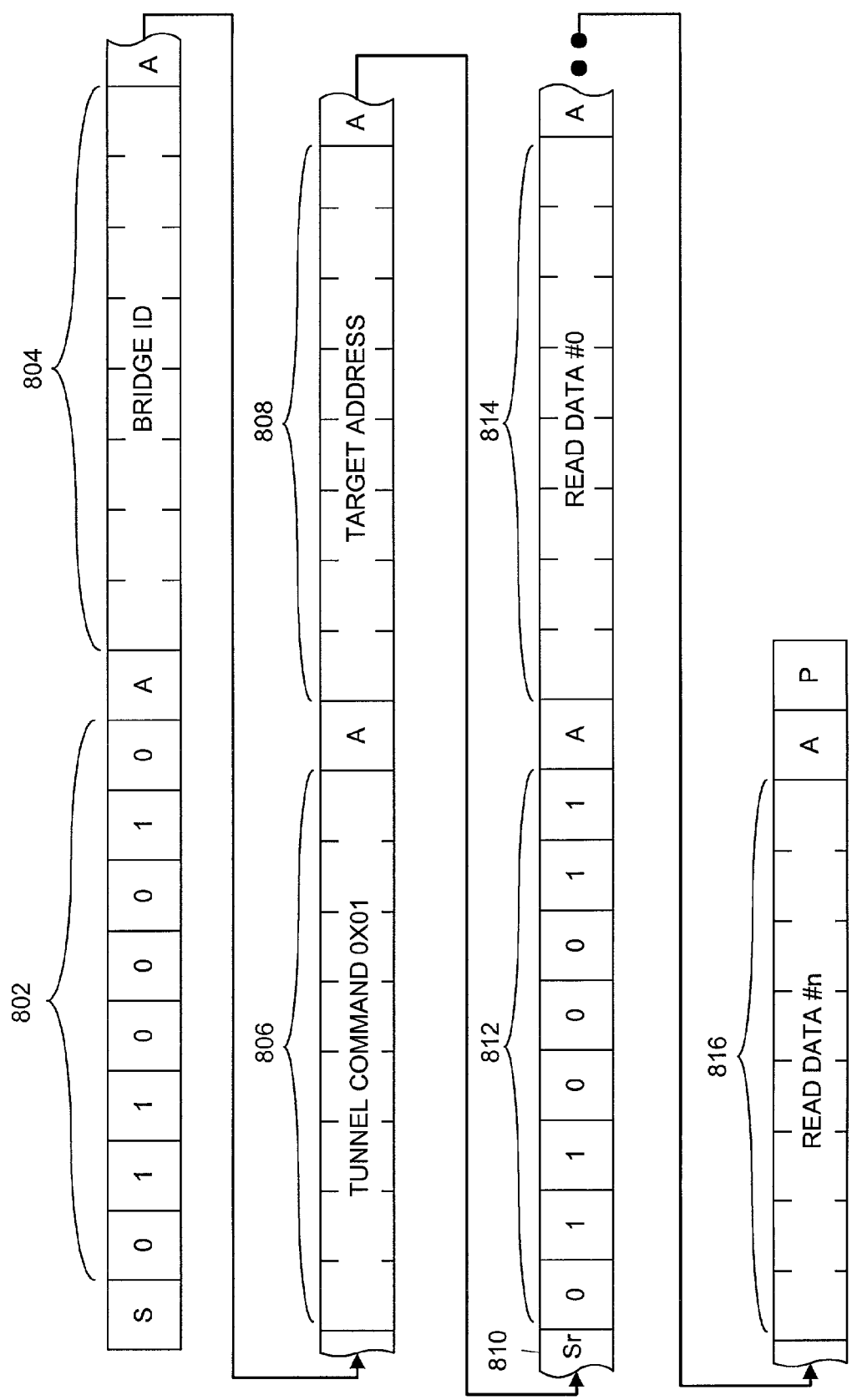
FIG. 8 is a time diagram showing the sequence of command signals generated by a bus master during a tunnel bridge command.

The syntax for a tunnel read command is shown in FIG. 8 and starts with the bridge address of 62h (802), followed by the bridge ID 804. Next, a command byte 806 of 01h is transmitted to indicate a tunnel command, and then the target address 808 is transmitted. At this point during a read transaction, a repeated START condition 810 is transmitted to reverse the data direction. Following this repeated START 810, the master issues the bridge read address 812 of 63h. Again, no bridge ID or command byte is issued at this point in the transaction. Rather, all the bridges in the path to the target bridge retain enough internal state such that they can continue forwarding the transaction to the bridge specified in the write portion of the transaction. Thus, the repeated START 810 and the read address 812 of 63h are forwarded along the path to the target bridge along with the read data bytes 814–816.

The tunnel write command is similar, but does not include the repeated START 810. Instead, the write data bytes are driven by the master immediately following the target address byte in a manner consistent with the slave being accessed.

In a manner similar to that described above for the register access command, a tunneled transaction is forwarded by the bridges in the system until the transaction reaches the target bridge as specified in the bridge ID byte. This bridge then recognizes the tunnel command byte 806 and interprets the following target address byte 808 as the slave address to be driven on its port-B bus. Once the target bridge has driven a START and the specified slave address on its port-B bus, it begins transparently forwarding data and ACK bits between its port-A and port-B interfaces. Similarly, any other bridges in the path between the initiating master and the target slave device operate transparently at this point. As in the case of a bridge register access, all the bridges in the active path through the hierarchy maintain this transparent mode of operation even through the repeated START 810 shown in FIG. 8. All bridges forward the initiating master's STOP condition at the end of the transaction, thus returning all the active bus segments to the idle state.

A final command that can be issued by a master is the UNCONFIG command. This command is a special type of command issued by the configuration host to return all bridges to their default unconfigured state, i.e. with their bridge IDs set to 00h, and with address filtering and deterministic arbitration support disabled. The UNCONFIG command could be used, for example, after a new hot-plug device has been added into the system. If the new device includes any bridge chips, then all the bridges in the system will possibly need to be renumbered in order to preserve the correctness of the bridge command forwarding mechanism. The addition of new $I^2C$ slave addresses to the $I^2C$ hierarchy can generally be accommodated without the need to unconfigure/reconfigure the bridges; a simple modification to the address filter bitmaps of the bridges in the hierarchy is generally sufficient.

The inventive bridge supports multimaster $I^2C$ operation on both its port-A and port-B interfaces. Since the bridge acts only as a slave on its port-A interface, there is nothing specific that it needs to do in order to support multimaster traffic on this interface. However, the port-B interface, acts as the master interface. Because of this, the bridge must handle all of the normal issues associated with multimaster $I^2C$ bus activity.

Perhaps the most basic requirement for a multimaster capable $I^2C$ master is the ability to perform bus arbitration. According to the aforementioned $I^2C$ Specification from Philips Semiconductor, bus arbitration is based on collisions between competing master or slave devices. Any device driving the bus with a pattern of address, data, or ACK/NAK bits watches the bus while it transmits, checking that the data appearing on the bus is what the device intended to drive. Because of the open-collector nature of the $I^2C$ bus, a device driving a "0" will always win out over a device driving a "1". When a device detects a "0" on the bus when it intended to drive a "1", it immediately aborts its involvement in the current transfer and releases the SCL and SDA lines.

A master device that "loses arbitration" in this manner may retry its transaction when the current transaction is terminated via a STOP condition. However, one problem with the $I^2C$ arbitration mechanism as designed by Philips Semiconductor is that, if multiple masters collide while driving the same address, such as if two masters attempt to write to the same device at the same time, then no collision will be detected, and both masters will proceed together on the bus, unaware of each other's presence. It is likely in this scenario that the masters will drive different data later in the write transaction, resulting in a loss of arbitration very late in a transaction. Handling this type of late loss of arbitration may be complex depending on the application, since some number of data bytes may have already been committed to the device before the error was detected.

Another problem that may arise when two masters are unknowingly on the bus at the same time is that the $I^2C$ arbitration mechanism does not work during START or STOP conditions. Thus, if one of the colliding masters issues a STOP or repeated START, the other master will need to handle this asynchronous error event in the midst of its write transaction.

In order to prevent these types of complex error scenarios, an extension to the $I^2C$ Specification was developed by Sun Microsystems called the "Deterministic Arbitration Protocol", more commonly referred to as the DA protocol and described in the aforementioned U.S. Pat. No. 6,175,887. The concept of the DA protocol is straightforward. Following a bus-idle condition, $I^2C$ masters implementing the DA protocol always drive as their first address a master-specific bit pattern called an "arbitration ID." By virtue of the fact that every master has a unique arbitration ID, this ensures that any masters colliding on the bus will detect the collision during this initial address phase. Following the transmission of the arbitration ID, the winning master proceeds with its intended $I^2C$ transaction via a repeated START. Thus, all the complexities associated with late collisions and asynchronous START or STOP conditions due to collisions are avoided.

In accordance with the principles of the invention, the bridge provides some special facilities for handling the DA protocol. For example, consider a configuration including an $I^2C$ bus with a master, a few slave devices, and an inventive bridge behind which are more slave devices.

Because the arbitration ID used by the master is used on every transaction, this initial address phase does not provide an indication of whether the intended transaction needs to be forwarded by the bridge. In fact, the bridge must be configured such that the bit-pattern used as the arbitration ID corresponds to an address that is not forwarded by the bridge. Otherwise, the bridge would claim and forward every transaction from the master, preventing the master from reliably communicating with the slave devices on the same bus segment with the master.

Rather, by programming the bridge's bitmap with a '0' in the bit position corresponding to the arbitration ID used by the master, the bridge will ignore the address issued as the DA protocol portion of the transaction. Following the transmission of the DA arbitration ID, the master will issue a repeated START and then the slave address of the intended target of the transaction.

The bridge will again look up this new address in its internal bitmap, and, if the corresponding bit is a '1', the remainder of the transaction will be forwarded to the port-B bus. Since by necessity the bridge ignored the DA portion of the transaction, the port-A master's DA arbitration ID does not pass to the port-B bus. Therefore, a mechanism has been provided in the bridge to cause it to use the DA protocol with a programmable DA arbitration ID when it forwards transactions to the port-B $I^2C$ bus.

This is accomplished through two registers, called DA_EN and DA_ID. These registers are discussed above in connection with FIGS. 3E and 3F but basically the DA_ID register, shown in FIG. 3F, contains the arbitration ID to be driven by the bridge on the port-B bus when forwarding transactions, and the DA_EN register, shown in FIG. 3E, is used to enable or disable the DA protocol. The default state following a reset is for bridges to not use the DA protocol.

In the process of forwarding transactions from the port-A interface to the port-B interface, collisions may occur if other masters exist on the port-B bus. If a bridge is configured to use the aforementioned DA protocol on the port-B bus, then these collisions should happen only in the first address phase of a new transaction, but nonetheless it is possible that a bridge will lose the arbitration process and be forced to relinquish the port-B bus. In the case where the arbitration loss occurs during the initial address, a bridge will automatically attempt retransmission of the forwarded transaction, up to a limit of ten (10) attempts per transaction. This automatic retry mechanism works only if the loss of arbitration occurs during the initial address phase. If the bridge loses arbitration ten times in a row while attempting to transmit the initial address phase on a given transaction, it will finally give up and return a NAK condition to the port-A master device.

Because the port-B master port on an inventive bridge can be connected to a multimaster bus, there are a number of error scenarios that may present themselves on the port-B interface. These are briefly:
1.) Transaction retry limit of ten retries exhausted.
2.) Late loss of arbitration.
3.) Asynchronous START or STOP detected.
4.) Failure to acquire port-B bus within 200 milliseconds.
5.) Slave on Port-B bus stalls a transaction with SCL low for more than 200 milliseconds.
6.) Protocol hang on port-B bus (Bus remains "busy" but with no activity.)
7.) Port-B slave device holding SDA low due to loss of bit synchronization.

Because the I²C bus does not provide any error reporting mechanisms aside from the NAK response, most of the errors listed above are signaled to the master connected to the port-A interface via NAK responses. The exceptions are items (6) and (7). The error scenarios described in items (6) and (7) above are recoverable situations in most cases. These recoverable port-B errors can be caused by a malfunctioning master or slave device on port-B, or if a master device, such as an inventive bridge, driving a transaction on the bus, is reset by the system in the middle of its transaction. When one of the following situations occurs, the bus can get into a state where master and slave devices are out of synchronization with regard to whether the bus is idle or busy, and also with regard to bit and byte synchronization.

In a first situation, a bridge believes that the bus is currently busy, but there is actually no master on the bus currently driving a transaction. This can happen if a master (other than an inventive bridge) issues a START condition, but then aborts its transaction without issuing a STOP condition. In this case, all I²C devices will consider the bus busy, and since the I²C protocol has no timeouts defined with regard to this type of hang, it can persist indefinitely.

In another situation, a master device aborts a transaction suddenly in the middle of reading a data byte from a slave, and if the slave happens to be driving a "0" on the bus, then the slave will continue to drive a "0" on the SDA line, waiting for the master to finish the transaction. Since the master has aborted the transaction, the bus is hung both from a protocol perspective as mentioned in the previous situation, but also because the slave is holding the SDA line LOW, which prevents masters from issuing new START or STOP conditions.

In order to recover from these two situations, when an inventive bridge is attempting to acquire the port-B bus, if the bus remains busy for 200 milliseconds, it will assume that the bus has become hung, i.e. that a master aborted a transaction, leaving the bus in the "busy" state. The bridges will then look at the SDA line to see whether any slave device appears to be holding the SDA line LOW. If so, it will toggle the clock line up and down in an attempt to cause the slave to shift out bits on the assumption that when the slave reaches what it believes to be the ACK bit, it will release SDA. When the bridge senses the SDA line become HIGH, it will then issue a START/STOP on the SDA/SCL lines to bring all I²C devices back into byte synchronization and protocol synchronization.

Note that, in the I²C bus definition, there is no recovery from the situation when a device hangs holding the SCL line LOW. If this happens to the port-B bus because of an errant device on that bus, then all transactions from a port-A master targeted to slave devices on the port-B bus will receive a NAK response from the bridge after a 200 millisecond timeout.

In addition to the error handling capabilities on the port-B interface, the port-A interface also implements a watchdog timer. This timer watches activity on the port-A interface and will cause the bridge to reset itself in the event that the transaction on the port-A interface stalls and fails to make forward progress for more than one second. In this way, if there is some type of electrical problem on the port-A interface that looks like a START condition, such as could occur when installing a hot-pluggable device, the bridge will reset itself after one second and will subsequently be ready for new activity. It should be noted that any master on a bus segment that also connects to the port-A interface of an inventive bridge must not stall its own transactions for more than one second, as this will cause the bridge to reset. In general, problems will begin to occur if master or slave devices stall transactions for more than 200 ms, since this will affect any bridges with port-B interfaces connected to that bus. The watchdog reset does not alter any software-visible state within a bridge.

Figure 9A:
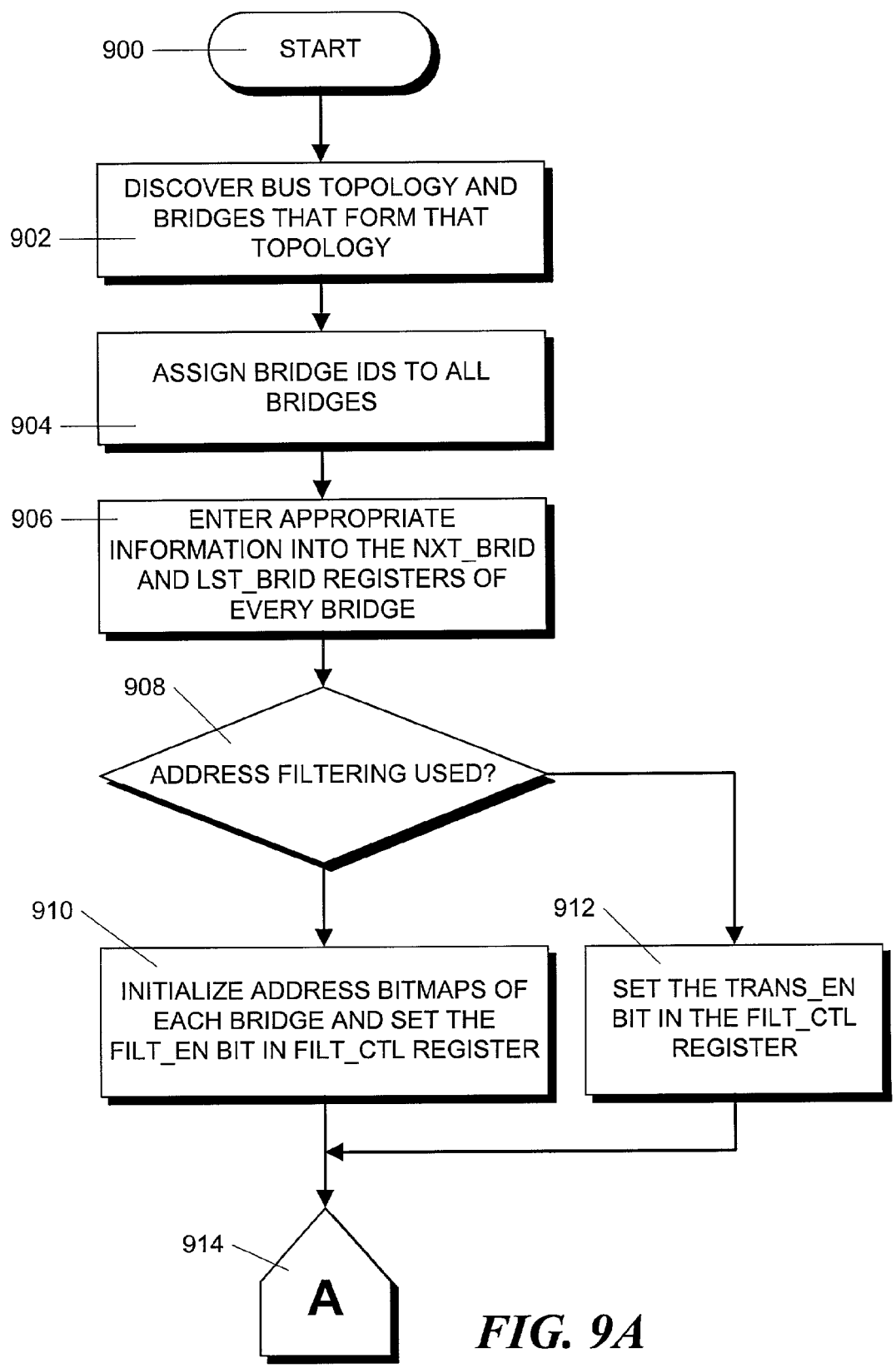
FIGS. 9A and 9B, when placed together, form a flowchart illustrating illustrative steps in a procedure for the configuration of bridges by a configuration host in an I²C system.
Figure 9B:
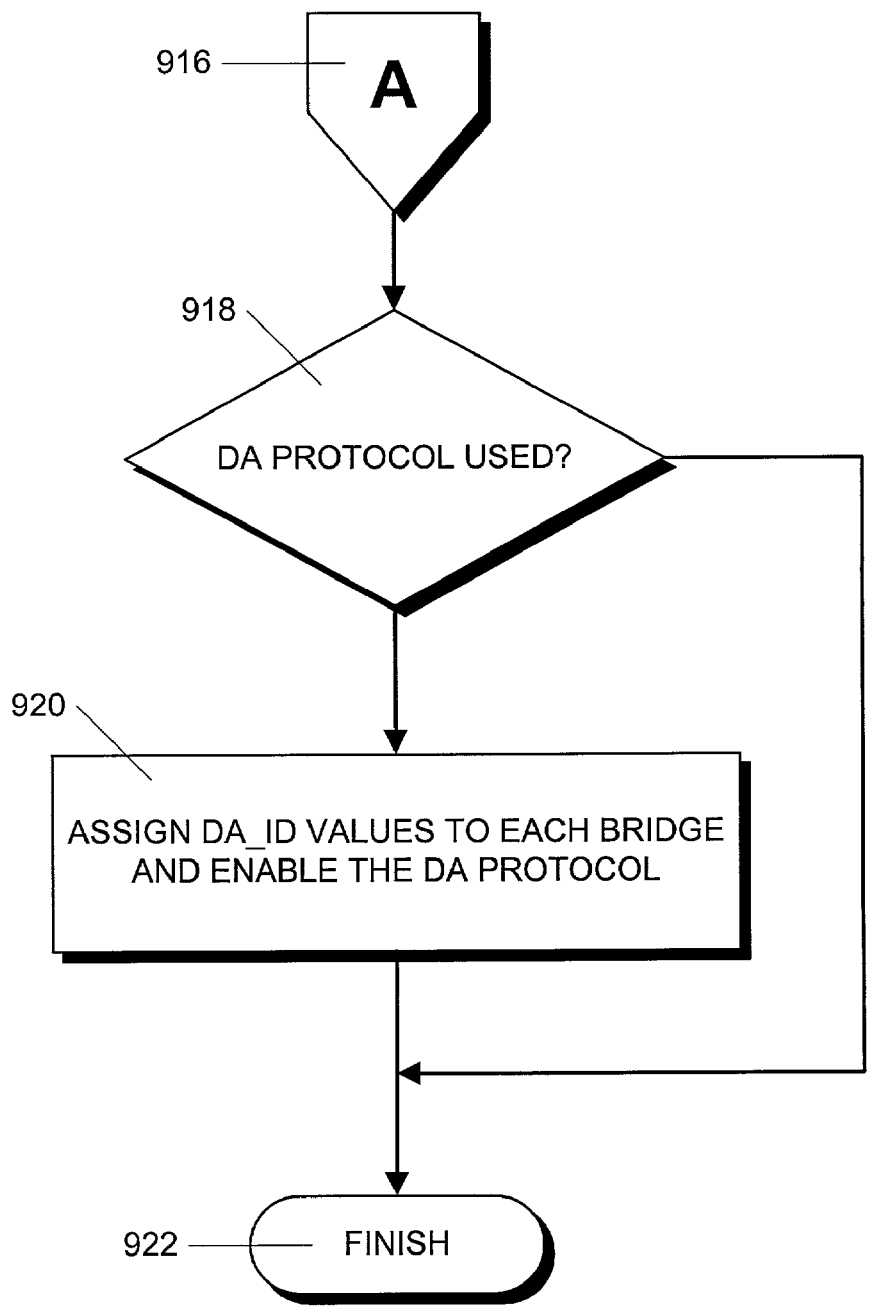

The inventive bridge is intended to allow the system designer a great deal of flexibility with regard to I²C bus topology and the distribution of I²C addresses within that overall topology. This flexibility is achieved through the programmability of various aspects of the bridge. The proper configuration of the bridges in an I²C system is key to the correct operation of the system. The basic configuration procedure is illustrated in FIGS. 9A and 9B and begins in step 900

In step 902, the procedure discovers the bus topology and the bridges that form that topology. Next in step 904, bridge IDs are assigned to all bridges. In step 906 appropriate information is entered into the NXT_BRID and LST_BRID registers (shown in FIGS. 3H and 3I) of every bridge to order the upstream and downstream bridges.

In step 908, a determination is made whether address filtering is to be used. If so, the address bitmaps of each bridge are initialized in step 910 and the FILT_EN bit is set in the FILT_CTL register (FIG. 3D) in order to enable address filtering. Alternatively, if in step 908, it is determined that a bridge is being used as a "firewall", then the TRANS_EN bit is set in the FILT_CTL register (FIG. 3D) in step 912. In either case, the procedure proceeds, via off-page connectors 914 and 916 to step 918.

In step 918, a determination is made whether the deterministic arbitration protocol discussed above will be used. If so, the process proceeds to step 920 in which DA_ID values are assigned to each bridge such that no two port-B bridge interfaces share the same DA_ID on a given bus, and DA protocol is enabled by setting the DA_EN bit in the DA_CTL register (FIG. 3E.) The procedure then finishes in step 922. Alternatively, if, in step 918, a determination is made that the deterministic arbitration protocol will not be used, the procedure finishes in step 922.

An illustrative set of bus topology rules and a procedure for configuring a bus that adheres to those topology rules is described below. These configuration rules are exemplary only and are not intended to be all encompassing or to place restrictions on what topologies are allowed. Instead, these topology rules and the associated configuration procedure are an illustration of how a configuration host, with no foreknowledge of the bus topology, could correctly discover and initialize a complex bus structure built using bridges constructed in accordance with the principles of the invention as discussed above.

In accordance with one illustrative embodiment, bus topology rules allow a generic bus configuration procedure to discover the topology of the bus and correctly initialize the bridges that comprise that topology. This bus configuration procedure is performed by software running on a configuration host, which is an I²C master device located on the bus being configured.

The preferred bus topology is a tree, with the configuration host located at the root bus of the tree. This type of topology allows the configuration host to probe down through the tree, discovering and numbering bridges as it goes. As previously mentioned, the NXT_BRID and LST_BRID registers are used by each bridge to define a range of bridge IDs that exist downstream of certain bridge. For this reason, it is necessary that all bridges downstream from a given bridge be given IDs that form a range. This allows upstream and downstream bridges to easily check whether a bridge transaction received on its port-A interface needs to be forwarded; downstream bridges forward bridge transactions addressed to IDs within the defined range, while upstream bridges forward transactions addressed to bridges outside the defined range. In this way, both the configuration host and masters at lower layers of the hierarchy are able to send bridge transactions to bridges throughout the system.

An example bus topology is shown below in FIG. 10. There are a total of four bus segments 1006, 1008, 1032 and 1036 in this system. In addition, there are five bridges 1004, 1014, 1016, 1020 and 1022. The configuration host 1000 is directly connected to a unidirectional bridge 1004 that faces downstream, passing transactions to bus segment 1008, and acting as a "firewall" bridge. In this example system, the implementation of this hypothetical configuration host lacks a sophisticated I²C port. Instead, it has only a very simple I²C interface consisting of two General Purpose I/O (GPIO) ports which are software stimulated (bit-banged) to function as an I²C master interface on bus segment 1006. Due to the bit-bang nature of this interface, host 1000 lacks multimaster support.

However, configuration host 1000 needs to drive transactions on multimaster bus segment 1008 and must interact with several bridges 1014, 1016, 1020 and 1022, and another master device 1002 at address 30h that are also connected to bus 1008. Bridge 1004 is used as a firewall device to allow the non-multimaster capable host 1000 to access the multimaster bus 1008. Although not shown in this diagram, bridge 1004 must have its CFG_IN# pin strapped LOW to allow configuration of this bridge.

Bridge pairs 1014/1016 and 1020/1022 are connected in parallel as described above and used to provide a bi-directional connection to two pluggable interfaces for attaching plug-in boards. In the illustrative example, two such plug-in boards 1024 and 1034 are shown connected at the bottom of the bus hierarchy.

In this example, the I²C addresses used by the devices 1026–1030 and 1038–1042 on the two plug-in boards, 1024 and 1034, respectively, are all unique. A unique address selection might be accomplished, for example, by one or two address select signals (not shown) that are present at the connector interface to the plug-in boards 1024 and 1034. These signals can be used to automatically select the device addresses for the I²C components on these boards. Thus, configuration of the bridges in this example system will consist of configuring the address bitmaps of all the bridges to allow transparent access to all slave devices by all masters.

In an alternate system implementation, for example, an I/O expansion chassis for InfiniBand[SM] target channel adapter (TCA) cards, the plug-in boards would all use the same I²C addresses. Such a system would require the use of the transaction tunneling procedure described above in order to provide access to all slaves by all masters.

Each of the master and slave devices 1002, 1010, 1012, 1026, 1028, 1030, 1038, 1040 and 1042, in FIG. 10 has its I²C slave address that is shown in the figure. The configuration host, being a master-only device, does not have a slave address. The numbers shown within each bridge 1004, 1014, 1016, 1020 and 1022 represent the bridge ID assumed by that bridge following a system reset. For example, bridge 1004 would assume a bridge ID of 00h following a system reset. Bridge 1014 would assume an ID of 01h, etc. Effectively, all downstream bridges assume a default ID of 00h, while all upstream bridges assume a default ID of 01h.

As can be seen in FIG. 10, bridges 1016 and 1020 have a signal 1018 called CFG_OUT# connecting them. This signal represents the CFG_OUT# output from bridge 1020, which connects to the CFG_IN# input of bridge 1016. This signal is required during bridge configuration to control which of the bridges 1016 and 1020 connected to bus segment 1008 can respond to a bridge transaction addressed to bridge ID 0. Bridge 1020 has its CFG_IN# pin strapped LOW, making it the default responder to bridge transactions on bus segment 1008 addressed to bridge ID=0. After bridge 1020 is assigned a valid ID (i.e. something other than 00h or 01h), bridge 1020 will pass this daisy chain grant to bridge 1016 via its CFG_OUT# pin.

At reset time, none of the bridges 1004, 1014, 1016, 1020 and 1022 will pass any transactions. During the configuration process, the configuration host 1000 will keep a global population address bitmap (GPB) for the system. The GPB for a system is a 32-byte bitmap similar to the address bitmap contained within each bridge, and simply has a "1" bit indicating a populated slave address. This allows the configuration host 1000 to keep track of populated slave addresses in the entire system as it configures the bus. As new slave addresses are discovered on each bus segment, the host will check these addresses against the GPB to check for replicated addresses.

In addition to the GPB, the configuration host 1000 will keep track of a local population address bitmap (LPB) for each bus segment. The collection of LPBs will be used to identify unused addresses on each segment that may be used as arbitration ID's for the DA protocol feature of the inventive bridge as discussed above.

Figure 11A:
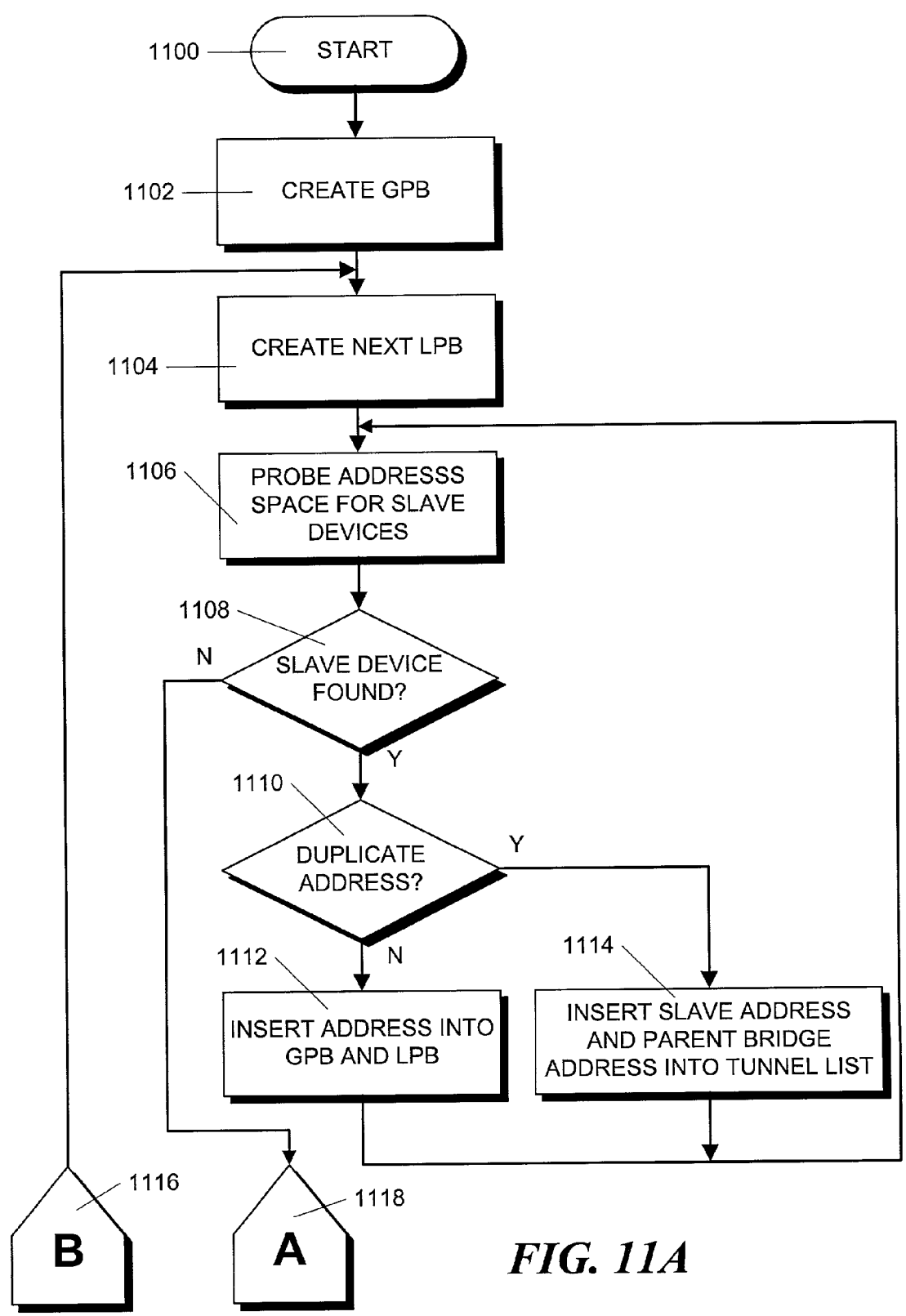
FIGS. 11A, 11B and 11C, when placed together, form a flowchart illustrating a detailed procedure for the configuration of the system shown in FIG. 10.
Figure 11B:
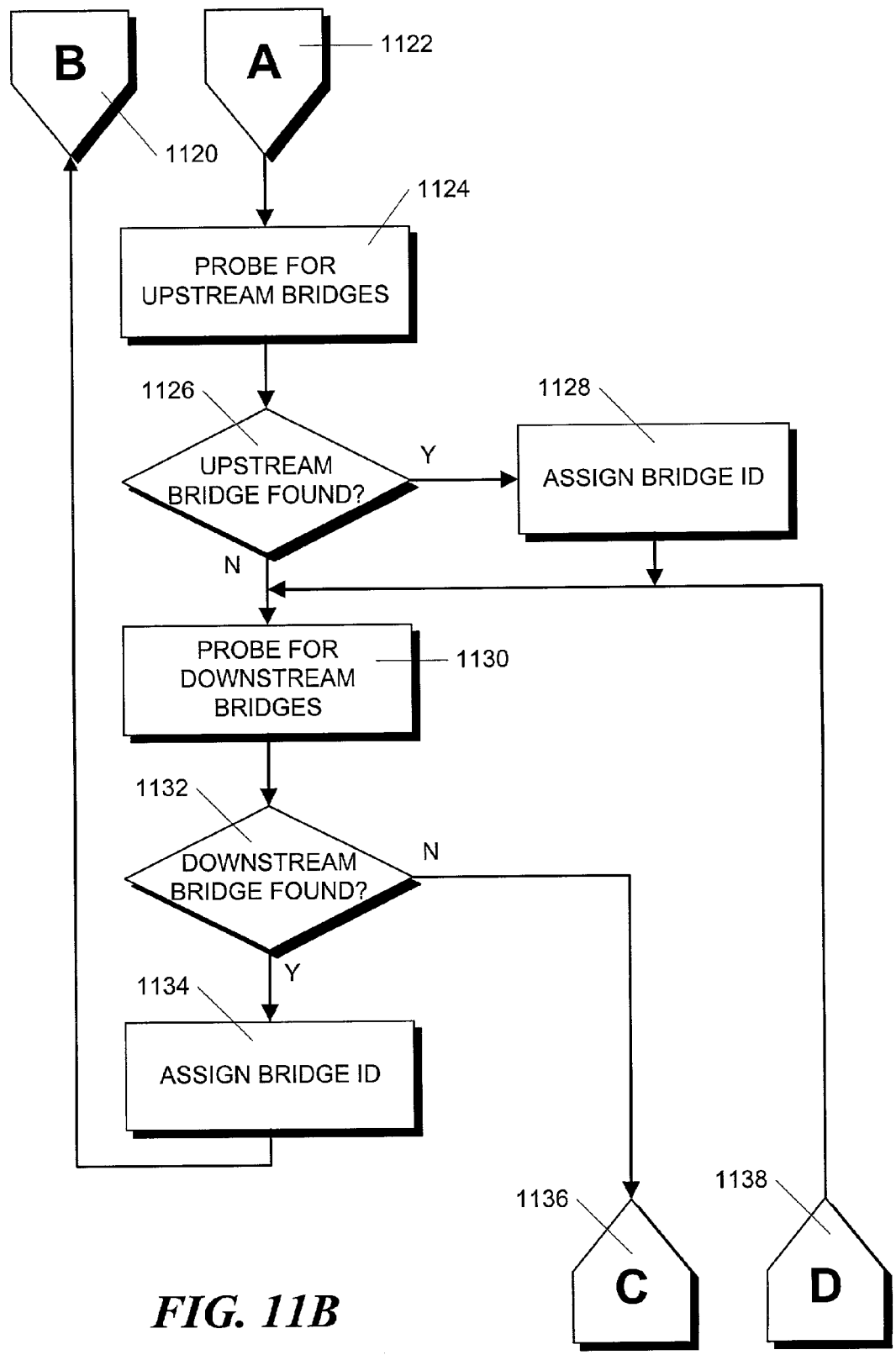
Figure 11C:
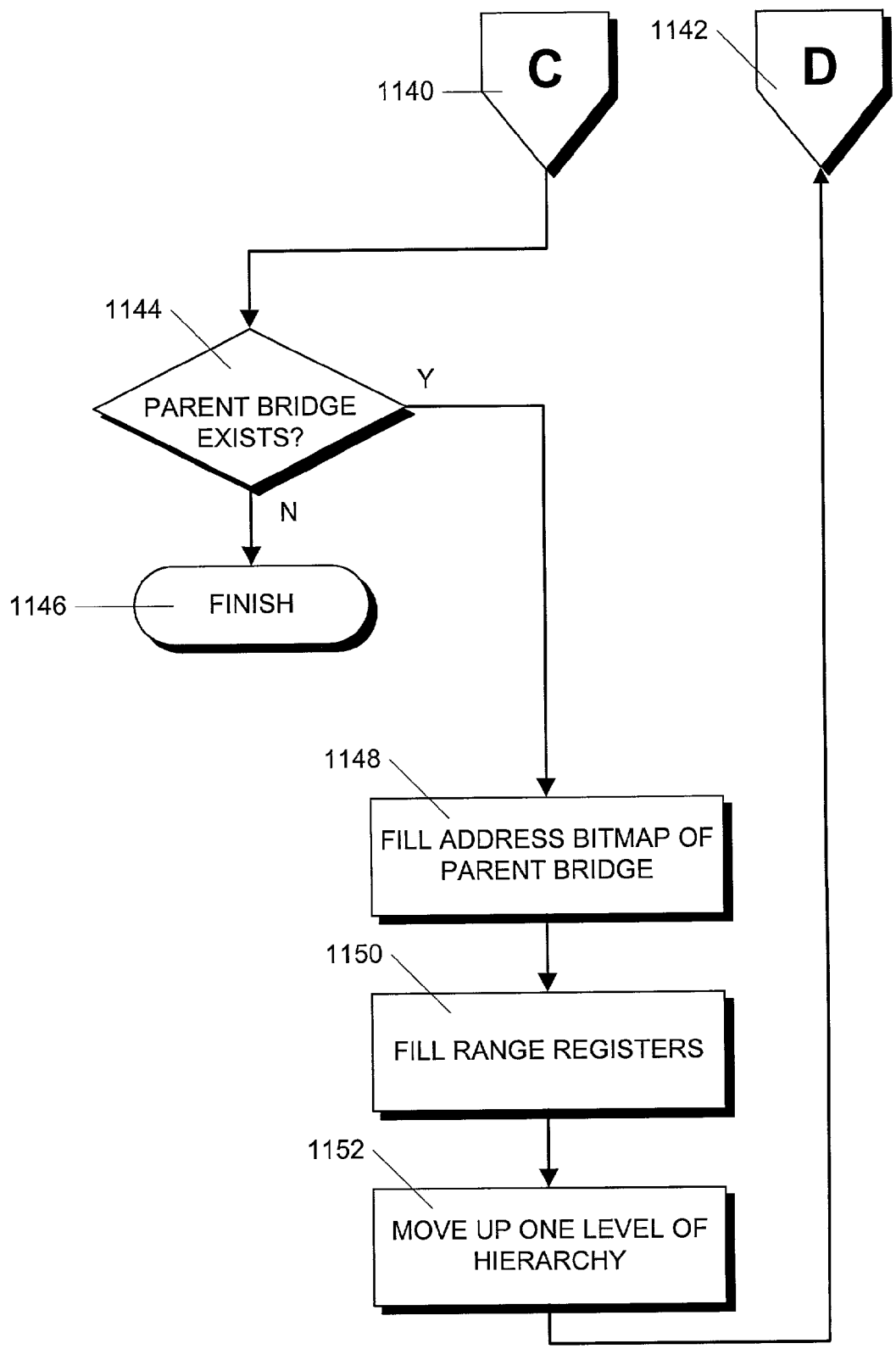

In order to number bridges in a manner consistent with the bridge transaction forwarding mechanism used by the inventive system, the configuration procedure follows a "depth-first" methodology. This means that, when a bridge is discovered at bus level "N", all the bus hierarchy beneath that bridge is recursively probed and configured before the configuration of any peer bridges on bus level "N". The steps in the configuration procedure of this example system are illustrated in FIGS. 11A, 11B and 11C.

The configuration procedure starts in step 1100 and proceeds to step 1102 where host 1000 creates the GPB for the system. In step 1104, the host creates LPB#0 for bus segment 1006, and, in step 1106, the host probes the I²C address space looking for populated slaves on bus segment 1006. Because bus segment 1006 is the root bus, probing is done via simple I²C read or write transactions, looking for an ACK bit returning from a slave after the I²C address phase. In step 1108, a determination is made whether a slave device has been found. In this case there are no slave devices and the procedure proceeds, via off-page connectors 1118 and 1122, to step 1124 where host 1000 probes for an upstream bridge on this bus segment 1006 by attempting to read the REVISION register of a bridge on bus segment

1006 at bridge ID=1. In step 1126, a determination is made that no upstream bridges are found so that the procedure moves to step 1130.

In step 1130 host 1000 probes for a downstream bridge on bus 1006 by attempting to read the REVISION register of a bridge at ID=0. This transaction succeeds, indicating the presence of bridge 1004 in step 1132. The procedure then moves to step 1134 where host 1000 provides bridge 1004 with an ID of "2" by writing its BR_ID register with 02h. (ID assignment starts at "2" because IDs "0" and "1" are reserved IDs.) Bridge 1004 then asserts its CFG_OUT# pin LOW, but with no effect since bridge 1004 has no peers. Bridge 1004 is defined to be the "parent bridge" of the newly discovered bus segment 1008. Likewise, bus segment 1008 is the child of bridge 1004. The use of a tree topology guarantees that a bus can have no more than one parent bridge. The NXT_BRID and LST_BRID registers for bridge 1004 remain at 00h, indicating no downstream bridges discovered yet. The procedure then returns, via off-page connectors 1120 and 1116 to step 1104 to configure any buses discovered behind the newly discovered bridge.

In step 1104 host 1000 creates LPB#1 for bus segment 1008 and continues the bus configuration recursion. In step 1106, host 1000 probes bus segment 1008 looking for slave devices. Note that the address bitmap of bridge 1004 has not yet been filled in, so this probe is accomplished using the aforementioned transaction tunneling procedure. Specifically, host 1000 sends tunnel commands to bridge 1004 at bridge ID=2 to perform write or read transactions on bus segment 1008. If a transaction completes normally, then a device exists at that address. This is how all probing behind bridges is accomplished.

In the configuration illustrated in FIG. 10, host 1000 will find slave devices at addresses A0h, A2h and 30h. When each device is found as determined in step 1108, the procedure moves to step 1110 where a determination is made by checking the addresses against addresses in the GPB for duplicate addresses. No duplicate addresses are present so that the procedure moves to step 1112 where the slave address is added to the GPB and to LPB#1. Alternatively, if duplicate addresses had been detected in step 1110, host 1000 leaves the associated bit in the LPB for the current bus segment clear, and instead adds the I²C address to a list of addresses that will need to be accessed via tunneling as indicated in step 1114. The parent bridge of the bus segment on which this address resides is also saved so that a tunnel transaction can be sent to the parent bridge to access this slave device.

After the slave address has been entered into either the GBP and LPB or into the tunnel list, the procedure returns to step 1106 to check for additional slave addresses. Steps 1108–1114 are repeated until no further slave addresses are detected in step 1108. Next the procedure proceeds, via off-page connectors 1118 and 1122 to step 1124 where host 1000 probes through bridge 1004 using a tunneled message, looking for a bridge at bridge ID=1. If present, this latter bridge would be the upstream bridge from bus segment 1008 back to bus segment 1006. There is no such bridge in the system shown in FIG. 10, so this latter bridge is not discovered as determined in step 1126.

The procedure then moves to step 1130 where host 1000 probes for a downstream bridge on bus 1008 at bridge ID=0. In step 1132, bridge 1020 is discovered. Bridge 1020 is defined as parent bridge of newly discovered bus segment 1036. In step 1134, host 1000 gives this downstream bridge a bridge ID of 03h, causing bridge 1020 to assert its CFG_OUT# 1018 LOW, thereby enabling bridge 1016 to respond to future bridge transactions addressed on bus 1008 to bridge ID=0, which will happen later.

The procedure returns to step 1104, via off-page connectors 1120 and 1116, where host 1000 creates LPB#2 for bus segment 1036 and, in step 1106, host 1000 probes bus 1036 looking for slave devices. The host 1000 will find slaves at addresses A4h, 9Ch, and 32h and process them by repeating steps 1108–1114.

The procedure then moves, via off-page connectors 1118 and 1122 to step 1124 where host 1000 probes for upstream bridge on bus segment 1036 at bridge ID=1 and finds bridge 1022. Host 1000 then assigns bridge 1022 a bridge ID of 4 in step 1128 and proceeds to step 1130. In step 1130 host 1000 probes for downstream bridges at bridge ID=0 on bus segment 1036, but finds none. The software recursion has reached the bottom of this leaf of the bus hierarchy.

Accordingly, from step 1132 the procedure moves, via off-page connectors 1136 and 1140 to step 1144 where a determination is made whether a parent bridge exists. If so, the procedure moves to step 1148 where the address bitmap of bus segment 1036 parent bridge (in this illustration bridge 1020) is filled in with the logical OR of LPB#2 and the bitmaps of all downstream bridges connected to bus segment 1036. In this case, there are no subordinate bridges, so the bridge 1020 address bitmap is simply filled in with the entries in LPB#2. Address filtering can be enabled at this time for bridge 1020 by setting the FILT_EN bit in its FILT_CTL register.

Since there is no further unconfigured bus hierarchy below bus segment 1036, the NXT_BRID and LST_BRID range registers for the parent bridge (bridge 1020) of segment 1036 are populated in step 1150. Since the parent bridge 1020 has an ID of 3, and the next unused bridge ID to be assigned is 5, the host 1000 writes the bridge 1020 NXT_BRID register and LST_BRID register both equal to 4, indicating that there is only a single bridge at bridge ID of 4 downstream of bridge 1020. Thus, bridge 1020 will forward bridge commands to bridge ID=4 to bus segment 1036. Similarly, the same values are written to the range registers of bridge 1022. Since bridge 1022 is an upstream bridge, it does not forward bridge commands within this range, since they are downstream. In step 1152. The procedure returns up one bus level, back to bus segment 1008 and the procedure returns via off-page connectors 1142 and 1138 to step 1130.

In step 1130, host 1000 probes for a downstream bridge on bus segment 1008 at bridge ID=0, and discovers bridge 1016 in step 1132. In step 1134, host 1000 writes a bridge ID of 5 to the BR_ID register of bridge 1016, causing bridge 1016 to assert its CFG OUT# pin LOW, but with no effect since there are no more unconfigured peer bridges on bus segment 1008. Bridge 1016 is parent bridge of newly discovered bus segment 1025. The procedure then proceeds, via off-page connectors 1120 and 1116 back to step 1104.

In step 1104, host 1000 creates LPB#3 and, in step 1106, host 1000 probes slave addresses, finding slave devices at addresses A6h, 9Eh, and 34h. These addresses are processed by looping through steps 1106–1114 as previously described.

When no more slave devices are found in step 1108, the process moves, via off-page connectors 1118 and 1122, to step 1124 where host 1000 probes for an upstream bridge on bus segment 1025 at bridge ID=1 and finds bridge 1014. In step 1128, host 1000 assigns this bridge a bridge ID of 6.

Next, in step 1130, host 1000 probes for a downstream bridge at bridge ID=0 on bus segment 1025, but finds none as determined in step 1132. The software recursion has reached the bottom of this leaf of the bus hierarchy and the process moves, via off-page connectors 1136 and 1140 to step 1144.

If a parent bridge exists as determined in step 1144, the process proceeds to step 1148. In this sample system, the parent bridge is bridge 1016. In step 1148, the address bitmap of this parent bridge 1016 is filled in with the logical OR of LPB#3 and the bitmaps of all subordinate downstream bridges connected to this bus segment. In this example, there are no downstream bridges on bus segment 1025. Accordingly, the address bitmap of bridge 1016 is set to the contents of LPB#3. Address filtering can be enabled at this time for bridge 1016 by setting the FILT_EN bit of its FILT_CTL register.

Since there is no further unconfigured bus hierarchy below this bus segment, the NXT_BRID and LST_BRID range registers for the parent bridge 1016 are filled in. Since bridge 1016 has a bridge ID of 5, and the next unused ID to be assigned is 7, the host 1000 writes a 6 into the NXT_BRID and LST_BRID registers of bridge 1016, indicating that there is only a single bridge at bridge ID of 6 downstream of bridge 1016. Thus, bridge 1016 will forward bridge commands addressed to bridge ID=6 on bus segment 1025. Similarly, the same values are written to the range registers of bridge 1014. Since bridge 1014 is an upstream bridge, it does not forward bridge commands to bridges within this range, since they are downstream. In step 1152, the process returns up one level, back to bus segment 1008 and then proceeds, via off-page connectors 1142 and 1138 to step 1130.

In step 1130, host 1000 probes for a downstream bridge at bridge ID=0 on bus segment 1008 and finds none as determined in step 1132. The illustrative process has configured all downstream bridges below this bus segment in the hierarchy. Therefore, the process proceeds, via off-page connectors 1136 and 1140, to step 1144 where a determination is made whether a parent bridge exists for this bus segment 1008. In the example, parent bridge 1004 exists for bus segment 1008. The process then moves to step 1148 where the address bitmap of parent bridge 1004 is filled in with the logical OR of LPB#1 and the address bitmaps of all subordinate downstream bridges connected to bus segment 1008. In this example, this calculation is (LPB#1) OR (bridge 1020 address bitmap) OR (bridge 1016 address bitmap). Address filtering can be enabled at this time for bridge 1004 by setting the FILT_EN bit of its FILT_CTL register.

Since there is no further unconfigured bus hierarchy below this bus segment 1008, the process proceeds to step 1150 where the NXT_BRID and LST_BRID range registers for parent bridge 1004 are filled. Since the parent bridge 1004 has an ID of 2, and the next unused ID to be assigned is 7, the host 1000 writes a 3 into the NXT_BRID register and a 6 into the LST_BRID register, indicating that there are 4 bridges downstream from bridge 1004, at bridge IDs 3, 4, 5, and 6. Thus, bridge 1004 will forward bridge commands to bridge IDs 3 through 6 to bus segment 1008. Next the process moves up one level in the hierarchy in step 1152 back to bus segment 1006 and the process returns, via off-page connectors 1142 and 1138 to step 1130.

In step 1130, host 1000 probes for additional downstream bridges at bridge ID=0 on bus segment 1006 and finds none as determined in step 1132. The procedure has configured all downstream bridges below this bus segment in the hierarchy. The process then proceeds, via off-page connectors 1136 and 1140, to step 1144 where a determination is made whether any parent bridge exists for bus segment 1006. Since bus 1006 is the root bus segment, there is no parent bridge, so the downstream portion of the bridge configuration is complete and the process finishes in step 1146.

Figure 12:
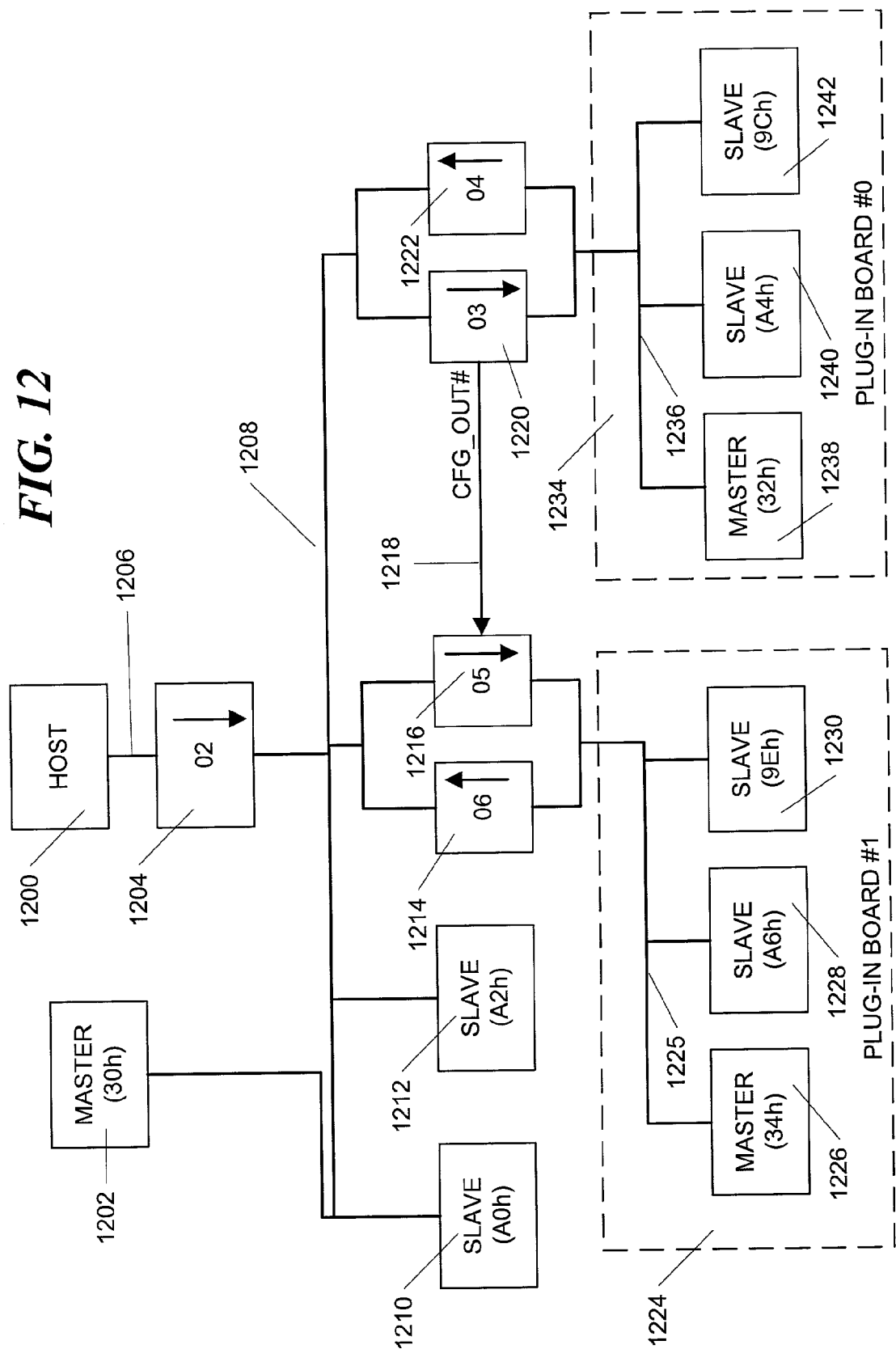
FIG. 12 is a block schematic diagram showing the exemplary system of FIG. 10 after configuration in accordance with the procedure set forth in FIGS. 11A–11C.

FIG. 12 below shows the state of the example system at this point. Items in FIG. 12 that correspond to items in FIG. 10 have been given corresponding numeral designations. For example, host 1000 in FIG. 10 corresponds to host 1200 in FIG. 12. In FIG. 12, all of the downstream bridges 1204, 1216 and 1220 have been assigned bridge IDs, and have had their address bitmaps initialized. All upstream bridges 1216 and 1222 have been assigned IDs, but their address bitmaps remain uninitialized. Address filtering is operational for the downstream paths. Thus, the configuration host 1200 and the master 1202 at address 30h on bus segment 1208 can see all the devices in the system. However, the masters 1226 and 1238 on the two plug-in boards 1224 and 1234, cannot access any devices other than the ones (1228, 1230 and 1240,1242, respectively, on their respective bus segments 1225 and 1236.

Figure 13:
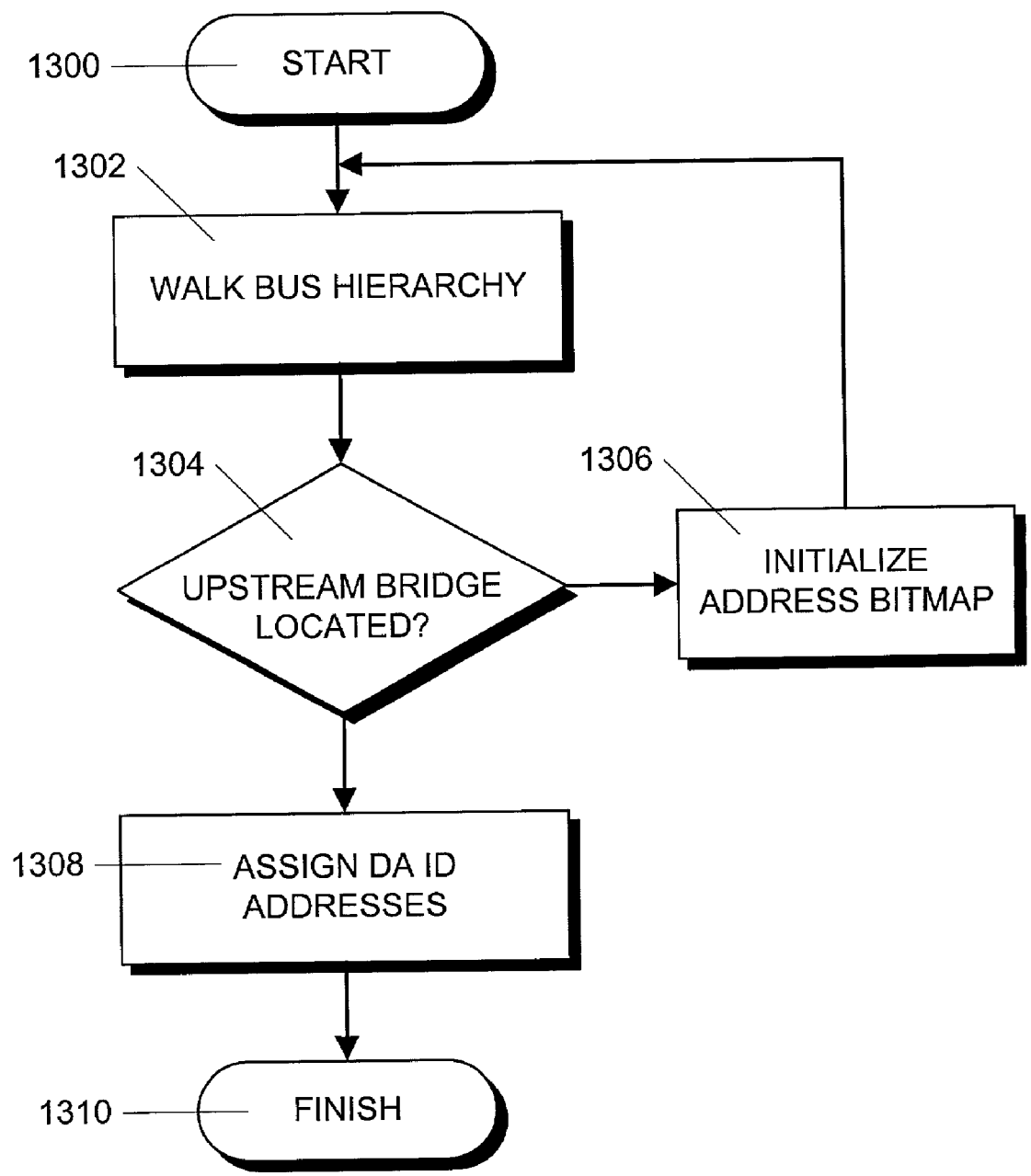
FIG. 13 is a flowchart illustrating illustrative steps in a procedure for completing the configuration of bridges by a configuration host in an I²C system.

The configuration process is completed using the process shown in FIG. 13. This process uses the information in the GPB and LPBs created in the process illustrated in FIGS. 11A–11C to fill in the address bitmaps of the upstream bridges 1214 and 1222. Since any duplicate addresses have already been omitted from the LPBs for each bus segment, no checking for duplicates is required.

Now that the entire bus hierarchy has been probed, it is a simple matter for the configuration host 1200 to walk through the system, programming the address bitmaps of all the upstream bridges 1214 and 1222. This procedure starts in step 1300 and proceeds to step 1302 where the configuration host 1200 uses the information regarding the bus topology to walk the bus hierarchy. The bus is walked in the same order in which it was initialized, going upstream bridge by upstream bridge.

In step 1304 a determination is made whether an upstream bridge has been found. If so, the process moves to step 1306 where the address bitmap is initialized. In the example system in FIG. 12, bridge 1222 is located first. The address bitmap for bridge 1222 is initialized with the XOR of the GPB and the bitmap already programmed into bridge 1220. This XOR function results in a bitmap that contains all the addresses in the system that are not on bus segment 1208 or below. Address filtering is then enabled in bridge 1222 by setting the FILT_EN bit in its FILT_CTL register.

The process then returns to step 1302 where the host 1200 continues walking the bus bridges in the system, this time stopping at bridge 1214 as determined in step 1304. In step 1306, the address bitmap for bridge 1214 is initialized with the XOR of the GPB and the bitmap already programmed into bridge 1216. This XOR function results in a bitmap that contains all the addresses in the system that are not on bus segment 1225 or below. Address filtering is enabled in bridge 1214 by setting the FILT_EN bit in its FILT_CTL register. The process then returns to step 1302.

In step 1304, host 1200 determines that no more upstream bridges remain. Bus configuration is complete and the process proceeds to step 1308. The configuration host 1200 may now choose addresses to use on each bridge's port-B interface for use as an ID for Deterministic Arbitration, as discussed above. In general, it does not matter whether the address used as a DA arbitration ID corresponds to a populated slave address; the DA protocol will issue a null write (with no data), so the state of an addressed slave should remain unaltered. In the event that this is a concern, the host 1200 can ascertain for each bus segment the list of addresses already claimed for that segment, and then use addresses that are not otherwise in use on this segment or being forwarded to any other segment. This list is stored in that bus segment's parent bridge's address bitmap. In the event that any duplicate addresses were found, the host 1200 should also check the tunnel list. The host can then choose from the list of unclaimed addresses for each bus segment and assign them to the masters on that bus and to the parent bridge for that bus for use as a DA arbitration ID as set forth in step 1308. The process then finishes in step 1310.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, a different microcontroller may be used. Other aspects, such as the specific state flows, as well as other modifications to the inventive concept are intended to be covered by the appended claims

What is claimed is:

1. A method for configuring a bus system having a plurality of bus segments with bus master devices and slave devices connected thereto, the bus segments connected by bus bridges and arranged in a hierarchy with levels, each bus bridge having a bridge ID, a plurality of internal registers and an address bitmap for controlling information flow through the bridge wherein each bridge responds to configuration commands sent to its bridge ID, the method comprising:
   (a) selecting an initial bridge ID value;
   (b) initially setting the bridge ID of all bridges to the initial bridge ID value so that all bridges start with the same bridge ID;
   (c) configuring bridges on a hierarchical level so that only one bridge at a time responds to a configuration command sent to the initial bridge ID value;
   (d) repeatedly sending configuration commands and data to the initial bridge ID value;
   (e) assigning a unique bridge ID different from the initial bridge ID value to each bridge that responds to the configuration commands and data; and
   (f) entering information into internal registers and address bitmap of each bridge that responds to the configuration commands and data to control the flow of information between bus segments.

2. The method of claim 1 wherein the bus topology is a tree configuration and steps (e) and (f) comprise performing a recursive procedure that configures each branch of the tree.

3. The method of claim 1 wherein the bus system has an address space and wherein the method further comprises:
   (g) probing the address space for slave devices.

4. The method of claim 3 wherein step (g) comprises:
   (g1) checking for a duplicate slave address when a slave device is located.

5. The method of claim 4 wherein step (g1) comprises:
   (g1a) inserting a slave address of a located slave device into a global address bitmap if the slave address is not a duplicate; and
   (g1b) inserting the slave address into a tunnel list if the slave address is a duplicate.

6. The method of claim 5 wherein step (g1) further comprises
   (g1c) repeatedly probing the address space for upstream bridges when no slave device is located.

7. The method of claim 6 wherein step (e) comprises assigning a bridge ID value to each located upstream bridge.

8. The method of claim 7 wherein step (g1) further comprises
   (g1d) repeatedly probing for downstream bridges when no further upstream bridges are located in step (g1c).

9. The method of claim 8 wherein step (e) comprises assigning a bridge ID value to each located downstream bridge.

10. The method of claim 9 wherein step (f) comprises entering information into internal registers and address bitmap of at least one downstream bridge when no further downstream bridges are detected in step (g1d).

11. The method of claim 1 further comprising:
   (g) walking the bus system to discover upstream bridges; and
   (h) entering information into internal registers and address bitmap of each discovered upstream bridge to control the flow of information between bus segments.

12. The method of claim 1 wherein step (c) comprises electrically connecting all bridges on the same hierarchical level together so that only one bridge at a time responds to configuration commands sent to the initial bridge ID value.

13. The method of claim 12 wherein all bridges on the same hierarchical level are connected in a daisy chain configuration.

14. The method of claim 13 wherein a bridge in the daisy chain configuration enables the next bridge in the daisy chain configuration to respond to the initial bridge ID value when the bridge is assigned a bridge ID value other than the initial bridge ID value.

15. The method of claim 1 wherein at least some of the bridges are bi-directional bridges comprised of two unidirectional bridges connected in parallel and wherein step (e) comprises giving the two unidirectional bridges different bridge ID values.

16. The method of claim 1 further comprising:
   (g) providing additional information to each bridge to enable the bridge to operate with a deterministic arbitration protocol.

17. Apparatus for configuring a bus system having a plurality of bus segments with bus master devices and slave devices connected thereto, the bus segments connected by bus bridges and arranged in a hierarchy with levels, each bus bridge having a bridge ID, a plurality of internal registers and an address bitmap for controlling information flow through the bridge wherein each bridge responds to configuration commands sent to its bridge ID, the apparatus comprising:
   a mechanism that selects an initial bridge ID value:
   a configuration host that initially sets the bridge ID of all bridges to the initial bridge ID value so that all bridges start with the same bridge ID;
   a mechanism that configures bridges on a hierarchical level so that only one bridge at a time responds to a configuration command sent to the initial bridge ID value;
   a mechanism that repeatedly sends configuration commands and data to the initial bridge ID value;
   a mechanism that assigns a unique bridge ID value different than the initial bridge ID value to each bridge that responds to the configuration commands and data; and
   a mechanism that enters information into internal registers and address bitmap of each bridge that responds to the configuration commands and data to control the flow of information between bus segments.

18. The apparatus of claim 17 wherein the bus topology is a tree configuration and the configuration host performs a recursive procedure that configures each branch of the tree.

19. The apparatus of claim 17 wherein the bus system has an address space and wherein the configuration host comprises a mechanism that probes the address space for slave devices.

20. The apparatus of claim 19 wherein the configuration host comprises a global address bitmap and a mechanism that uses the global address bitmap to check for a duplicate slave address when a slave device is located.

21. The apparatus of claim 20 wherein the configuration host comprises a mechanism that inserts a slave address of a located slave device into the global address bitmap if the slave address is not a duplicate; and inserts the slave address into a tunnel list if the slave address is a duplicate.

22. The apparatus of claim 21 wherein the configuration host comprises a mechanism that repeatedly probes the address space for upstream bridges when no slave device is located.

23. The apparatus of claim 22 wherein the bridge ID assigning mechanism comprises a mechanism that assigns a bridge ID value to each located upstream bridge.

24. The apparatus of claim 23 wherein the configuration host further comprises a mechanism that repeatedly probes for downstream bridges when no further upstream bridges are located by the upstream bridge locating apparatus.

25. The apparatus of claim 24 wherein the bridge ID assigning mechanism comprises a mechanism that assigns a bridge ID value to each located downstream bridge.

26. The apparatus of claim 25 wherein the information entering mechanism comprises a mechanism that enters information into internal registers and address bitmap of at least one downstream bridge when no further downstream bridges are detected by the downstream bridge locating mechanism.

27. The apparatus of claim 17 further comprising a mechanism that walks the bus system to discover upstream bridges and a mechanism that enters information into internal registers and address bitmap of each discovered upstream bridge to control the flow of information between bus segments.

28. The apparatus of claim 17 wherein the mechanism that configures bridges comprises CFG IN/CFG OUT pins on each bridge wherein all bridges on the same hierarchical level have their CFG IN/CFG OUT pins connected together so that only one bridge at a time responds to the initial ID value.

29. The apparatus of claim 28 wherein the CFG IN/CFG OUT pins of all bridges on the same hierarchical level are connected in a daisy chain configuration.

30. The apparatus of claim 29 wherein a bridge in the daisy chain configuration enables the next bridge in the daisy chain configuration to respond to the initial bridge ID value when the bridge is assigned a bridge ID value other than the initial bridge ID value.

31. The apparatus of claim 17 wherein at least some of the bridges are bi-directional bridges comprised of two unidirectional bridges connected in parallel and wherein the bridge ID assigning mechanism comprises a mechanism that assigns the two unidirectional bridges different bridge ID values.

32. The apparatus of claim 17 further comprising a mechanism that provides additional information to each bridge to enable the bridge to operate with a deterministic arbitration protocol.

33. A computer program product for configuring a bus system having a plurality of bus segments with bus master devices and slave devices connected thereto, the bus segments connected by bus bridges and arranged in a hierarchy with levels, each bus bridge having a bridge ID, a plurality of internal registers and an address bitmap for controlling information flow through the bridge wherein each bridge responds to configuration commands sent to its bridge ID, the computer program product comprising a computer usable medium having computer readable program code thereon, including:

program code that selects an initial bridge ID value;

program code that initially sets the bridge ID of all bridges to the initial bridge ID value so that all bridges start with the same bridge ID;

program code that configures bridges on a hierarchical level so that only one bridge at a time responds to a configuration command sent to the initial bridge ID value;

program code that repeatedly sends configuration commands and data to the initial bridge ID value;

program code that assigns a unique bridge ID value different than the initial bridge ID value to each bridge that responds to the configuration commands and data; and program code that enters information into internal registers and address bitmap of each bridge that responds to the configuration commands and data to control the flow of information between bus segments.

34. A computer data signal embodied in a carrier wave for configuring a bus system having a plurality of bus segments with bus master devices and slave devices connected thereto, the bus segments connected by bus bridges and arranged in a hierarchy with levels, each bus bridge having a bridge ID, a plurality of internal registers and an address bitmap for controlling information flow through the bridge wherein each bridge responds to configuration commands sent to its bridge ID, the computer data signal comprising:

program code that selects an initial bridge ID value;

program code that initially sets the bridge ID of all bridges to the initial bridge ID value so that all bridges start with the same bridge ID;

program code that configures bridges on a hierarchical level so that only one bridge at a time responds to a configuration command sent to the initial bridge ID value;

program code that repeatedly sends configuration commands and data to the initial bridge ID value;

program code that assigns a unique bridge ID value different than the initial bridge ID value to each bridge that responds to the configuration commands and data; and program code that enters information into internal registers and address bitmap of each bridge that responds to the configuration commands and data to control the flow of information between bus segments.

* * * * *